(12) United States Patent
Schedlbauer et al.

(10) Patent No.: US 11,912,505 B2
(45) Date of Patent: Feb. 27, 2024

(54) METHOD AND PICKING SYSTEM WITH IMPROVED OPERATION OF AUTONOMOUS CONVEYING VEHICLES

(71) Applicant: TGW Logistics Group GmbH, Marchtrenk (AT)

(72) Inventors: Michael Schedlbauer, Hengersberg (DE); Andreas Schmidberger, Wels (AT); Christian Michael Siket, Linz (AT); Harald Schroepf, Wels (AT)

(73) Assignee: TGW Logistics Group GmbH, Marchtrenk (AT)

( * ) Notice: Subject to any disclaimer, the term of this patent is extended or adjusted under 35 U.S.C. 154(b) by 329 days.

(21) Appl. No.: 16/962,949

(22) PCT Filed: Jan. 15, 2019

(86) PCT No.: PCT/AT2019/060013
§ 371 (c)(1),
(2) Date: Jul. 17, 2020

(87) PCT Pub. No.: WO2019/140471
PCT Pub. Date: Jul. 25, 2019

(65) Prior Publication Data
US 2021/0362953 A1 Nov. 25, 2021

(30) Foreign Application Priority Data
Jan. 18, 2018 (AT) .............................. A 50039/2018

(51) Int. Cl.
*B65G 1/137* (2006.01)
*B65G 1/04* (2006.01)
*G06Q 10/087* (2023.01)

(52) U.S. Cl.
CPC ......... *B65G 1/1378* (2013.01); *B65G 1/0492* (2013.01); *G06Q 10/087* (2013.01)

(58) Field of Classification Search
CPC ... B65G 1/1378; B65G 1/0492; G06Q 10/087
See application file for complete search history.

(56) References Cited

U.S. PATENT DOCUMENTS 7,467,503 B2 * 12/2008 Davolio ............... B65G 1/1373
53/134.1
8,983,647 B1 * 3/2015 Dwarakanath ....... G05D 1/0217
700/216
(Continued)

FOREIGN PATENT DOCUMENTS

| CA | 2474254 A1 | 7/2003 |
| CN | 1642834 A | 7/2005 |

(Continued)

OTHER PUBLICATIONS

International Search Report in PCT/AT2019/060013, dated May 9, 2019.
Chinese Office Action in CN 201980015095.5 dated Jun. 2, 2021.

*Primary Examiner* — Kyle O Logan
(74) *Attorney, Agent, or Firm* — Collard & Roe, P.C.

(57) ABSTRACT

The invention relates to a picking system (1) for picking goods (2a, 2b), comprising a goods acceptance zone (A1), a goods transfer zone (D1, D2), a storage zone (B1 . . . B7), (a) storage conveying device(s) (3), an order processing computer for registering a picking order and (a) removal conveying device(s) (4), wherein the storage conveying device(s) (3) and/or the removal conveying device(s) (4) has/have a plurality of autonomous conveying vehicles (5a . . . 5l, 6a . . . 6h) for transporting the goods (2a, 2b)/ordered goods (2c) on a travel surface. The travel surface is subdivided into multiple travel surface segments (E1 . . . E8), and driving movements are co-ordinated so that at least 90% of each of the driving movements in the travel surface segments (E1 . . . E8) is carried out by a closed group of autonomous conveying vehicles (5a . . . 5l, 6a . . . 6h). The (Continued)

invention further relates to a method for operating the picking system (1).

26 Claims, 4 Drawing Sheets

(56) References Cited

U.S. PATENT DOCUMENTS

| | | | | |
|---|---|---|---|---|
| 9,733,646 | B1* | 8/2017 | Nusser | B65G 1/137 |
| 9,975,699 | B2* | 5/2018 | Yamashita | B65G 1/1378 |
| 2015/0066283 | A1* | 3/2015 | Wurman | G05D 1/0225 |
| | | | | 701/25 |
| 2016/0145045 | A1* | 5/2016 | Mountz | B65G 1/137 |
| | | | | 700/218 |
| 2021/0362953 | A1* | 11/2021 | Schedlbauer | B65G 1/0492 |

FOREIGN PATENT DOCUMENTS

| | | |
|---|---|---|
| CN | 1643731 A | 7/2005 |
| CN | 101208490 B | 5/2011 |
| CN | 105473469 B | 5/2017 |
| CN | 107215601 A | 9/2017 |
| DE | 10 2014 111 385 A1 | 2/2016 |
| DE | 10 2015 114 410 A1 | 3/2017 |
| FR | 2 840 283 A1 | 12/2003 |
| JP | 2000-177811 A | 6/2000 |
| JP | 2016-055966 A | 4/2016 |

\* cited by examiner

METHOD AND PICKING SYSTEM WITH IMPROVED OPERATION OF AUTONOMOUS CONVEYING VEHICLES

CROSS REFERENCE TO RELATED APPLICATIONS

This application is the National Stage of PCT/AT2019/060013 filed on Jan. 15, 2019, which claims priority under 35 U.S.C. § 119 of Austrian Application No. A50039/2018 filed on Jan. 18, 2018, the disclosure of which is incorporated by reference. The international application under PCT article 21(2) was not published in English.

BACKGROUND OF THE INVENTION

1. Field of the Invention

The invention relates to a method for operating a picking system for picking goods, wherein the goods are transported from a goods acceptance zone, in particular a goods-in point, to a storage zone and are stored in this storage zone by (a) storage conveying device(s), wherein the storage zone has a plurality of storage areas for storing the goods. Further, a picking order is registered and ordered goods which are required for the picking order are determined. Afterwards, the ordered goods are removed from the storage zone and transported by (a) removal conveying device(s) from the storage zone to a goods transfer zone, in particular a goods-out point. The transport of the goods by means of the storage conveying device(s) and/or the transport of the ordered goods by means of the removal conveying device(s) is carried out at least in part by a plurality of autonomous conveying vehicles, which drive on a travel surface.

The invention further relates to a picking system for picking goods, comprising a goods acceptance zone, in particular a goods-in point, and a goods transfer zone, in particular a goods-out point. The picking system further comprises a storage zone having a plurality of storage areas for storing the goods, as well as (a) storage conveying device(s) connecting the goods acceptance zone and the storage zone, which storage conveying device(s) is/are configured for transporting the goods from the goods acceptance zone to the storage zone and for storing the goods into the storage zone. The picking system further comprises an order processing computer for registering a picking order and for determining ordered goods which are required for the picking order. Furthermore, the picking system has (a) removal conveying device(s) connecting the storage zone and the goods transfer zone, which removal conveying device(s) is/are configured for removing the ordered goods from the storage zone and for transporting the ordered goods from the storage zone to the goods transfer zone. Here, the storage conveying device(s) and/or the removal conveying device(s) has/have a plurality of autonomous conveying vehicles for transporting the goods/ordered goods on a travel surface.

2. Description of the Related Art

A method and a picking system of the mentioned kind are known in principle. For example, in this context, DE 10 2014 111 385 A1 discloses a storage-and-picking system with a rack arrangement, which has a plurality of racks and a plurality of vertical conveyors. Further, at least one fleet of autonomously movable, driverless transport vehicles and a travel surface determined for these transport vehicles is provided, which travel surface is essentially barrier-free, in particular free from rack spaces, and which extends below, above or through the rack arrangement. In terms of conveyor technology, the mentioned level is coupled to the rack arrangement via the vertical conveyors. The transport vehicles drive from one waypoint to the next on the travel surface. A fleet manager is adapted for generating and issuing driving orders for the transport vehicles to transport the storage goods transported by the vertical conveyors onto the travel plane along individual travel paths from and to the vertical conveyors and to transfer them in the absolute sequence.

It is disadvantageous about the known system that the driving movements, in particular at high traffic density, are difficult to plan and co-ordinate. In addition, the mentioned system is inefficient, and upward or downward capacity adjustments are equally only possible in an inefficient manner with the known system.

SUMMARY OF THE INVENTION

It is hence an object of the invention to specify an improved picking system and an improved method for operating such picking system. In particular, the disadvantages specified above are to be overcome.

The object of the invention is achieved with a method of the kind mentioned at the beginning, in which driving movements in travel surface segments, which subdivide the travel surface, are each carried out for the most part by a closed group of autonomous conveying vehicles and an exchange of autonomous conveying vehicles between two different travel surface segments (during normal operation of the picking system) does not exceed a maximum of 10%, advantageously a maximum of 5%, of the journeys carried out on the travel surface.

The object of the invention is also achieved with a picking system of the kind mentioned at the beginning, in which the travel surface is subdivided into multiple travel surface segments and a control is provided, which is adapted for co-ordinating the driving movements in at least one travel surface segment, wherein the driving movements in the travel surface segments are each carried out for the most part by a closed group of autonomous conveying vehicles and an exchange of autonomous conveying vehicles between two different travel surface segments do not exceed a maximum of 10%, advantageously a maximum of 5%, of the journeys carried out on the travel surface.

In other words, at least 90% (advantageously 95%) of each of the driving movements in travel surface segments, which subdivide the travel surface, are carried out by a closed group of autonomous conveying vehicles.

The proposed measures ensure that the driving movements are easy to plan and co-ordinate despite high traffic density. An exchange of autonomous conveying vehicles between different groups can be enabled to a small extent, for example through connecting paths between the travel surface segments, or be entirely excluded. The former enables the simple adjustment to performance requirements, for example by making available in a group autonomous conveying vehicles not required in another group, in which former group there is a (temporary) bottleneck of autonomous conveying vehicles. Yet the change of autonomous conveying vehicles from one travel surface segment onto another need not serve the capacity adjustment, but can also be part of the picking process. The connection of different travel surface segments can, also in this case, be done, for example, through narrow connecting paths. When an exchange during normal operation is excluded (exchange journeys=0%), the driving movements are even easier to plan and co-ordinate. Connecting paths are then obsolete.

Within the scope of the invention, "autonomous conveying vehicles" are to be understood to mean self-propelled and/or driverless conveying vehicles for the transport of goods, which drive along permanently prescribed tracks or which are freely guided, i.e. without fixed track guidance. A fix track guidance can be prescribed at the floor of the travel surface, for example with the help of optical color stripes, with magnetic strips or also with marker tags. Within the scope of the invention, railborne vehicles do not fall under autonomous conveying vehicles with fixed track guidance. A track guidance prescribed in a software and never changed in a travel surface without track guidance prescribed by hardware (i.e. without, for example, color markings on the floor of the travel surface) constitutes a borderline and/or mixed case and can be counted among both the free track guidance and the fixed track guidance. An autonomous conveying vehicle has in particular a transport platform, on which the goods/ordered goods to be transported are accommodated temporarily. For example, the transport platform can be a fixed, level surface at the autonomous conveying vehicle, but the transport platform can also be vertically and/or laterally movable relative to an underframe of the autonomous conveying vehicle, for example to be able to store goods/ordered goods into a storage rack and remove them from the storage rack. Wheels, of which at least one is driven, are arranged at the underframe. At least one of the wheels is steerable, unless the autonomous conveying vehicle has wheels with which also a lateral movement can be executed (e.g. Mecanum wheels). Further, an autonomous conveying vehicle also comprises an electronic control for receiving commands by a superordinate control and for controlling/regulating the movements of the autonomous conveying vehicle. Finally, an autonomous conveying vehicle comprises sensors for registering the environment of the autonomous conveying vehicle and for spatial orientation.

A "storage area" is a region of the picking system at which a good can be deposited and stored. A "storage zone" is a region of the picking system which has a plurality of storage areas for storing the goods. For example, the storage zone can be configured as a storage rack which provisions a plurality of storage areas next to one another and above one another. Yet it is also conceivable that the storage zone is a region at the floor of the picking system, which is provided and/or reserved for depositing and storing a good. Walk and travel zones are therefore not storage zones but can adjoin to same.

A "goods acceptance zone" is to be understood to mean that region in which goods are fed into the picking system, i.e. in particular a goods-in point. In particular, goods carriers (e.g. pallets, cardboard boxes, etc.) that have been delivered can be separated in a manual or automated manner. This procedure is also referred to as "depalletizing."

A "goods transfer zone" is to be understood to mean that region in which goods are fed out of the picking system, i.e. in particular a goods-out point. In particular, goods on provisioned goods carriers (e.g. pallets, cardboard boxes, etc.) can be compiled and/or picked in a manual or automated manner in accordance with a picking order. This procedure is also referred to as "palletizing."

It should be noted that neither the "goods acceptance zone" nor the "goods transfer zone" need be arranged at a physical exterior border of the picking system (for example within the meaning of a gate) but can also be positioned on the interior of the picking system. However, the goods acceptance zone and the goods transfer zone form in particular functional borders of the picking system. This means that a delivered goods package (e.g. a loaded pallet) is incorporated into the process flows of the picking system at a goods acceptance zone. Accordingly, at a goods transfer zone, a goods package to be discharged is disincorporated from the process flows of the picking system.

"Goods" are generally objects of the trade in goods and are delivered at the goods acceptance zone and discharged to a customer at the goods transfer zone in accordance with an order. Goods which are allocated to an order are referred to within the scope of the invention as "ordered goods." The allocation to an order can be done for goods already in storage or, in principle, even before. In particular, the ordered good can in this case be passed through from a goods acceptance zone to a goods transfer zone. Such ordered goods are also referred to as "cross-docking goods." Cross-docking goods are often stored on pallets, which are deposited in a storage zone for a short period of time and are dispatched in an essentially unchanged state (i.e. without being depalletized). A sales order often comprises both cross-docking goods and individually-picked goods, i.e. goods which are depalletized in the picking system or delivered in an already separated state and which are individually added to an order.

Characteristic parameters, which render the advantage of a segmentation of the travel surface well apparent, are, among other things,
  the vehicle density of the autonomous conveying vehicles on the travel surface,
  the maximum/mean vehicle speed of the autonomous conveying vehicles on the travel surface,
  the collision rate of the autonomous conveying vehicles on the travel surface and
  the collision probability of the autonomous conveying vehicles on the travel surface.

Within the scope of the invention, the "vehicle density" $\rho_{FZ}$ specifies the number of autonomous conveying vehicles $n_{FZ}$ in relation to the size of the travel surface $A_F$.

$$\rho_{FZ} = \frac{n_{FZ}}{A_F} [m^{-1}]$$

Within the scope of the invention, the "collision rate" $\delta_K$ specifies the number of collisions $n_K$ between autonomous conveying vehicles per unit of time t, if the latter drive at the maximum speed on the shortest route from a starting point prescribed by the picking process to a destination point prescribed by the picking process, i.e. for example convey an ordered good from the storage zone to the goods transfer zone without intervention by an anti-collision control. The collision rate reaches a maximum value when all autonomous conveying vehicles are constantly moving and pause only briefly at the respective destination point. The collision rate $\delta_K$ increases with the vehicle density and the vehicle speed.

$$\delta_K = \frac{n_K}{t} [s^{-1}]$$

Within the scope of the invention, the "collision probability" $P_K$ specifies the probability of collisions occurring between autonomous conveying vehicles on the travel surface when the latter drive at the maximum speed on the shortest route from a starting point prescribed by the picking process to a destination point prescribed by the picking process without intervention by an anti-collision control. The collision probability $P_K$ is defined by the relation between the number of collisions $n_K$ between autonomous conveying vehicles and the number of all journeys of autonomous conveying vehicles $n_G$ carried out on the travel surface in the same reference period. The collision probability $P_K$ can therefore assume values between 0 and 1 and increases with the vehicle density.

$$P_K = \frac{n_K}{n_G} 0..1$$

The segmentation of the travel surface reduces the collision rate $\delta_K$ and the collision probability $P_K$ for the same vehicle density $\rho_{FZ}$ and vehicle speed compared to picking systems with an unsegmented travel surface. Thus, not only the collision rate $\delta_K$ and the collision probability $P_K$ as such decreases but also the amount of control required to avoid collisions. When the avoidance of collision is (also) carried out in the autonomous conveying vehicle, the autonomous conveying vehicle can, if the travel surface is segmented, hence be structured in a simpler manner than if the travel surface is unsegmented.

Generally, the advantage of the segmentation of the travel surface is particularly apparent whenever the autonomous conveying vehicles can move in a chaotic and/or entirely free manner and do not drive in a co-ordinated manner on prescribed paths. The collision rate and the collision probability then increase greatly.

It should be noted in relation to what has been said that the collision rate and the collision probability are specified on the basis of a fictitious operating condition, which does not normally happen in reality, as control interventions prevent these collisions. A control intervention for avoiding collision is, as a general rule, performed whenever a collision is imminent and/or an autonomous conveying vehicle obstructs another. Within this meaning, the "collision rate" can also be understood to mean "obstruction rate" or "control rate" and the "collision probability" to mean "obstruction probability" or "control probability." Control interventions for avoiding collision can generally be performed by a superordinate control and/or in an autonomous manner by the vehicle itself. The sensor system required to that end and the methodology applied in this process are known in principle from the prior art and are hence not explained in detail at this point.

Although the operating condition specified above is fictitious, it is nevertheless well-suited to set out the underlying set of problems of the invention. The reason for this is that the collision rate and collision probability specified above can be calculated and/or simulated in a relatively simple manner, as complicated control interventions need not be taken into account in this case. Basically, the interaction between "unintelligent" autonomous conveying vehicles moved essentially on a straight line and at a constant speed is to be considered. The layout of the travel surface is used as a basis for said simulation, as well as the positions of the starting and destination points of the conveying vehicles, which constitute transfer points to another part of the picking system, specifically to (a) fixed-installation conveying device(s) such as conveyor belts, roller conveyors, lifts and suchlike or to a storage zone. While it is possible, in principle, to take the control interventions for avoiding collision into account even in a simulation, this leads to much more complex algorithms.

The above-mentioned starting and destination points generally form "transfer points" situated on the travel surface, which transfer points constitute, for one thing, interfaces between the autonomous conveying vehicles with (a) fixed-installation conveying device(s) (e.g. with a conveyor belt, a roller conveyor, a lift, a paternoster, etc.), at which goods/ordered goods are transferred by the autonomous conveying vehicles to the fixed-installation conveying device(s) or vice versa. Yet transfer points can, for another thing, also be formed by interfaces with storage zones, at which goods/ordered goods are stored or removed by the autonomous conveying vehicles. The transfer points are in particular part of the storage conveying device(s) and/or removal conveying device(s) and/or arranged along the route of the storage conveying device(s) and/or removal conveying device(s). In addition, the transfer points form those points on the travel surface to which the autonomous conveying vehicles necessarily drive as per their intended use. Hence, accumulations of autonomous conveying vehicles and/or high vehicle density occur in particular at these transfer points and/or in transfer zones which surround these transfer points. Accordingly, the "collision rate/obstruction rate/control rate" and the "collision probability/obstruction probability/control probability" is also relatively high there.

In contrast to the "transfer zone", in the "travel zone" a transfer between autonomous conveying vehicles and (a) fixed-installation conveying device(s) or between autonomous conveying vehicles and a storage zone is not possible. The vehicle density is lower there, in particular in case of free track guidance, because not each autonomous conveying vehicle must drive on a particular part of the conveyance zone (unless there is a bottleneck in the travel zone). Accordingly, the "collision rate/obstruction rate/control rate" and the "collision probability/obstruction probability/control probability" is, as a general rule, lower there than in the transfer zones and/or at the transfer points.

As a rule, the borders between a transfer zone and a travel zone are fluent and a sudden change of the vehicle density will not occur but a gradual change.

"(A) fixed-installation conveying device(s)" require(s) permanently integrated devices for the transport of goods. For example, a lift requires a frame, in which a lifting platform is moved. In contrast to this, the lifting platform alone is non-functional. (A) fixed-installation conveying device(s) is/are in particular characterized in that it/they cannot be extracted from the picking system without loosening fastenings. In contrast to this, an autonomous conveying vehicle can be extracted from the picking system without loosening fastenings.

In addition to the easy plannability and co-ordination of the driving movements, a particular advantage of the segmentation of the travel surface lies also in the fact that the normal operation in case of a failure of specific travel surface segments can be perpetuated in those travel surface segments where no failure has occurred. In the given context, "normal operation" means that a travel surface segment is operated in accordance with its intended use and a picking process is executed failure-free. If a failure has occurred, the picking process cannot be executed, or can only be executed to a smaller degree, in the respective travel surface segment.

In case of failure or in case of maintenance, the access for individuals to travel surface segments the access to which is blocked during normal operation can be released, for example to enable the rectification of the failure and/or maintenance of the picking system. In this case, special measures for the protection of the individuals located in the respective travel segment can be taken. For example, the travel speed of the autonomous conveying vehicles can be reduced compared to the normal operation. For this reason, the autonomous conveying vehicles can also be stopped altogether. In contrast to this, the normal operation can be perpetuated in those travel surface segments in which no failure has occurred. The segmentation ensures that a reduction of the travel speed of the autonomous conveying vehicles or a stopping of same has a much smaller effect on the overall performance of the picking system in case of failure than it does in an unsegmented travel surface such as it is used in the prior art. A stopping of the autonomous conveying vehicles for the protection of the individuals located on the travel surface in the prior art is equal to a total failure of the picking system, after all.

The normal operation can, in addition, be interrupted by a change of the operating mode of the picking system. For example, multiple performance stages can be provided for the picking system, between which it is possible to switch to adjust the picking system to different performance requirements. For example, the performance requirement of a picking system, as a rule, is subject to seasonal fluctuations. A picking system is hence often operated at high capacity for example during Christmas time, whereas it is operated at lower capacity during vacation time. Yet the switch-overs between the operating modes can also be carried out with a higher frequency, for example during shift changeover. For example, it can be provided to operate the picking system at lower capacity during the night than during the day.

The capacity adjustment and/or the change of the operating mode can be associated with the temporary shut-down and/or temporary putting into operation of parts of the picking system, in particular with the temporary shut-down and/or temporary putting into operation of travel surface segments. It is thereby achieved that an adjustment of the picking system to lower system performance is not associated with a decreasing of the efficiency with which the picking system is operated, but the picking system can be operated at high efficiency even during lower system performance. This means that travel surface segments are advantageously shut down or put into operation on the basis of a capacity need from the picking system.

In an illustrative example, four out of five travel surface segments are switched off to reduce the system performance to 20% of the maximum capacity. This is considerably more efficient than operating a single and unsegmented travel surface at just 20%. The reason for this is that, in the first case, also co-ordinate energy users such as for example a heating system/cooling system, a lighting system and suchlike can be deactivated, which is not possible in the unsegmented travel surface. This means that co-ordinate energy users must, as a rule, continue to be operated at full capacity on the travel surface even when the system performance is reduced. While the segmented travel surface in the above example has a capacity need for the co-ordinate energy users of just 20% compared to the maximum capacity, the unsegmented travel surface according to the prior art requires 100% of the maximum capacity. So the measures of the invention are in particular also of advantage whenever the picking system is not operated constantly with the maximum capacity, but there are also phases of lower capacity.

It is further conceivable that (a) fixed-installation conveying device(s) (for example conveyor belts, roller conveyors, lifts, paternosters and suchlike) leading toward the travel surface or leading away from the travel surface supplies/ supply only those travel surface segments that are actually operated on the basis of the current capacity need. In this case, it is of advantage if travel surface segments which are situated further away are deactivated first. This will result in not only a saving of energy for said fixed-installation conveying device(s) leading toward the travel surface or leading away from the travel surface but also a saving of travel distance and thus a saving of time during the transport of goods itself. This means that goods/ordered goods are not transported unnecessarily far, nor for an unnecessarily long time by the fixed-installation conveying device(s) leading toward the travel surface or leading away from the travel surface. This, too, is not readily possible in the unsegmented travel surface from the prior art. Hence, the segmentation of the travel surface leads also to higher efficiency in the partial-load range with regard to the distance traveled by the goods/ordered goods and the time that is required for this distance.

Accordingly, it is of advantage if
a first travel surface segment is put out of operation before a second travel surface segment when a transport path on (a) fixed-installation conveying device(s) running between a storage area and a transfer point in the first travel surface segment is longer than a transport path on the fixed-installation conveying device(s) running between this storage area and a transfer point in the second travel surface segment and/or
a first travel surface segment is put into operation after a second travel surface segment when a transport path on (a) fixed-installation conveying device(s) running between a storage area and a transfer point in the first travel surface segment is longer than a transport path on the fixed-installation conveying device(s) running between this storage area and a transfer point in the second travel surface segment.

In particular, said paths are to be understood to mean the shortest transport paths each. Furthermore, said conditions apply in particular to each storage area in the picking system. The measures provided hence enter into force in particular whenever the shortest transport paths on (a) fixed-installation conveying device(s) running between all storage areas and a transfer point in the first travel surface segment are longer than the shortest transport paths running between these storage areas and a transfer point in the second travel surface segment. In particular in essentially equivalent solutions, the travel surface segments can also be put out of or into operation randomly or even coincidentally, in particular to achieve an even wear and tear of the autonomous conveying vehicles.

It is further conceivable that, during a change of the operating mode of the picking system, autonomous conveying vehicles of switched-off travel surface segments are used at least in part in the travel surface segments remaining active. This means that, between the individual operating modes, an exchange of autonomous conveying vehicles between two different travel surface segments is conceivable which exchange exceeds the limit of a maximum of 10% of the journeys carried out on the travel surface that is in place during normal operation of the picking system. In these transit phases, even 100% of the journeys carried out on the travel surface can concern an exchange of autonomous conveying vehicles between two different travel surface segments. This can even increase the efficiency in the partial-load operation compared to the full-load operation if the autonomous conveying vehicles of a shut-down travel surface segment "assist" in a travel surface segment remaining active and the travel surface segment that remained active has a higher picking performance at almost the same energy need. Further, this ensures that the capacity adjustment in the picking system can be done in a finely graded manner.

Here, said transit phases constitute separate periods of time between phases of the normal operation. This means that there are time pauses between the phases of the normal operation, during which time pauses said exchange of autonomous conveying vehicles can take place. In principle, two embodiments are conceivable here. In one variant, there are no journeys for the transport of goods of the autonomous conveying vehicles altogether in the transit phases. This means that 100% of the journeys carried out on the travel surface concern an exchange of autonomous conveying vehicles between two different travel surface segments. Yet it is also conceivable that a part of the journeys carried out on the travel surface concerns the transport of goods and another part concerns journeys for the exchange of autonomous conveying vehicles between two different travel surface segments. For example, the distribution in the transit phase can be 50/50. It is in particular also conceivable that the share of the journeys for the exchange of autonomous conveying vehicles between two different travel surface segments is high at the beginning of a transit phase (and is, for example, even 100%) and is successively reduced, in particular linearly, to 0%, in the course of the transit phase.

Generally, a transit phase is shorter than 10% and advantageously shorter than 5% of the normal-operation phase. This means that, in an 8-h shift, the transit phase would be shorter than around 45 minutes and/or shorter than around 22 minutes (i.e. in the example the 8 hrs constitute 110% and/or 105%).

It should also be noted that the transit phase is not necessarily a period of time that is globally valid for the entire picking system, but transit phases between different pairs of travel surface segments can also each occur at different points in time, can have different durations and can be of a different nature with regard to the distribution of the journeys between journeys for the transport of goods and journeys to exchange vehicles. This means that a change of an operating mode can concern a just locally-limited part of the picking system.

It becomes apparent from what has been said that the measures of the invention, in particular in the partial-load range of a picking system, have clear advantages over the unsegmented travel surfaces known from the prior art.

It should also be noted at this point that multiple strategies for storing goods are conceivable in principle. These are of relevance in particular when not each travel surface segment is connected via the conveyor(s) with the entire storage zone but only with a part of the storage zones existing in the picking system. (A) good(s) can now be stored in the picking system in such a way that two travel surface segments are connected via the conveyor(s) only with storage zones in which, at least in part, goods of different kinds are stored. This means that specific goods are accessible only via a first travel surface segment but not via a second, and vice versa. This is of advantage whenever a very large number of different goods are stored in the picking system. Yet it is also conceivable that the kinds of goods which are stored in a storage zone connected via the conveyor(s) with a travel surface segment are the same for all travel surface segments. This means that all kinds of goods are accessible via all travel surface segments. This is of advantage whenever relatively few different goods are stored in the picking system, as this enables the processes in the picking system to be designed in a more flexible manner. This is true in particular whenever only a part of the travel surface segments is operated (e.g. in the partial-load range or in case of a fault). This variant is thus also particularly fail-safe.

It is favorable if there are different temperatures in the travel surface segments. For example, frozen goods can be moved in a first travel surface segment and goods/ordered goods to be stored at room temperature can be moved in a second travel surface segment.

It is further advantageous if autonomous conveying vehicles of a first design operate in a first travel surface segment and autonomous conveying vehicles of a second, different design operate in a second travel surface segment. For example, the autonomous conveying vehicles can have transport platforms of different sizes and/or accommodate different rated loads and/or be designed for different temperature ranges. In addition, the sets of control electronics of the autonomous conveying vehicles can be adjusted to different ambient conditions (in particular temperatures). In particular, autonomous conveying vehicles adjusted to different temperatures can drive in travel surface segments in which there are different temperatures.

It is furthermore advantageous if autonomous conveying vehicles with a first maximum speed operate in a first travel surface segment and autonomous conveying vehicles with a second, different maximum speed operate in a second travel surface segment. In this way, it can be avoided that slow autonomous conveying vehicles obstruct faster autonomous conveying vehicles.

In addition, it is advantageous if a first travel surface segment is free for the access by persons during normal operation of the picking system and if a second travel surface segment is blocked from the access by persons during normal operation of the picking system. For example, in the travel surface segment blocked for persons, autonomous conveying vehicles can be in transit, which autonomous conveying vehicles are potentially more dangerous for persons than those autonomous conveying vehicles which are in transit in the travel surface segment open to persons. Potentially dangerous autonomous conveying vehicles are, for example, particularly fast and/or particularly heavy. It would also be conceivable that the autonomous conveying vehicles operating in the travel surface segment which is blocked for persons are fitted out in a less complex manner with regard to their sensor system than the autonomous conveying vehicles operating in the travel surface segment open to persons and are hence less effective and/or less swift in identifying dangers. The autonomous conveying vehicles can therefore be adjusted to different safety requirements with regard to their structure.

In case of failure, what has already been said further above applies. In case of failure or in case of maintenance, the access for individuals to travel surface segments the access to which is blocked during normal operation can be released, for example to enable the rectification of the failure and/or the maintenance of the picking system. In this case, special measures for the protection of the individuals located in the respective travel segment can be taken. For example, the travel speed of the autonomous conveying vehicles can be reduced compared to the normal operation. For this reason, the autonomous conveying vehicles can also be stopped altogether.

It is further favorable if the goods are stored separated in a first storage zone and in groups, in particular on pallets, in a second storage zone. Such a procedure is particularly advantageous whenever orders (more often than not) also comprise groups of ordered goods, in particular complete pallets of these ordered goods. A separation and/or depalletization of the goods in the goods acceptance zone is then useful only in part. Instead, such ordered goods are manipulated directly on the pallet.

It is furthermore advantageous if the goods/ordered goods are transported both separated and in groups, in particular on pallets, by the autonomous conveying vehicles in a travel surface segment. In this variant embodiment, both individual goods/ordered goods and (other) goods/ordered goods in groups can be compiled into a shipment in a travel surface segment. For example, an order can contain both complete pallets of a first ordered good and a piece or multiple pieces of a second ordered good. The proposed measures enable the compilation of a shipment in a particularly flexible manner.

Yet it is also advantageous if the goods/ordered goods are transported by the autonomous conveying vehicles only separated in a first travel surface segment and only in groups, in particular on pallets, in a second travel surface segment. In this variant embodiment, individual goods/ordered goods and (other) goods/ordered goods in groups are complied into a shipment in different travel surface segments. The autonomous conveying vehicles which convey groups of goods/ordered goods (in particular complete pallets), are, as a general rule, slower than autonomous conveying vehicles which are designed for the transport of individual goods/ordered goods. The proposed measures ensure that obstructions of the faster autonomous conveying vehicles by the slower autonomous conveying vehicles are avoided.

It is also conceivable that the variants specified above in relation to the separated good(s) are applied to small groups of goods. Accordingly, the goods/ordered goods can be transported in groups of different sizes by the autonomous conveying vehicles in a travel surface segment. It is also conceivable that the goods/ordered goods are transported by the autonomous conveying vehicles in a first group size in a first travel surface segment and in a different group size and in a second travel surface segment. In this case, the group size is determined by the number of members of a group.

It is particularly advantageous if a relation between a number of the autonomous conveying vehicles located on a travel surface segment and a number of transfer points on this travel surface segment, which constitute interfaces between the autonomous conveying vehicles and (a) fixed-installation conveying device(s) or a storage zone, is below 5. In this way, the "collision rate/obstruction rate/control rate" and the "collision probability/obstruction probability/control probability" can be decreased, in particular in the region of these transfer points. After all, the transfer points form those points on the travel surface to which the autonomous conveying vehicles necessarily drive as per their intended use. Hence, accumulations of autonomous conveying vehicles and/or high vehicle density occur in particular at these transfer points and/or in transfer zones which surround these transfer points. Providing the above-mentioned condition ensures that the vehicle density is maintained in an acceptable range, in particular in the transfer zones.

It is favorable if the travel surface segments are structurally separated from one another. In this way, it can be excluded that an autonomous conveying vehicle (inadvertently) changes from one travel surface segment onto another travel surface segment. For example, multiple travel surface segments can be structurally separated from one another by walls.

It is particularly advantageous if multiple travel surface segments are arranged vertically on top of one another in different levels. A particular advantage in case of the arrangement of the travel surface segments in levels at different heights lies in the fact that this system is easily expandable. For example, if it emerges during the operation of the picking system that the capacity of the autonomous conveying vehicles is not sufficient (any more) for the demanded picking performance, the picking performance can be increased in a simple manner by adding further travel surface levels. It is also particularly advantageous in this context that the storage racks integrated in a picking system, as a rule, are configured very high anyway and that no structural alteration of the exterior shell of the building of the picking system is required when adding further travel surface levels. In contrast to this, in systems in which the travel surface is arranged only in one level, an expansion is difficult or even impossible under certain circumstances, in particular when the environment of the picking system has already been integrated and no space for a widthwise expansion is available. It is also advantageous that in case of a vertical segmentation of the travel surface, the exterior shell of the building comes very close to a cubic shape, which is advantageous for the need of material required for the erection of the building and for the heating/cooling need of the building. In contrast to this, if a same-size travel surface is situated in one level, this results in a rather disadvantageous shape of the building, which leads to an increased need of material for the erection of the building and to an increased heating/cooling need for the building.

Another advantage of this construction lies in the fact that transfer points are created in each of the travel surface segments by vertical conveyors (lifts, paternosters and suchlike) which connect the levels of the travel surface segments. This means that, when a further travel surface segment level is added, also additional transfer points are created, whereby the capacity of the added travel surface segment is essentially identical to the capacity of another (already existing) travel surface segment.

In contrast to this, an enlargement of an unsegmented travel surface according to the prior art, does not "automatically" lead to a generation of further transfer points and thus also not to a performance increase of the picking system. In the worst case, an enlargement of the travel surface in the prior art leads to no performance increase whatsoever, for example whenever the number of the transfer points is not increased and the enlargement of the travel surface leads merely to a reduction of a vehicle density in a travel zone which is already sufficiently low anyway.

In particular when the storage zone is divided over multiple storage levels each of which is allocated to a travel surface segment level, multiple strategies for storing goods are conceivable in principle. (A) good(s) can be stored in the picking system in such a way that, at least in part, goods of different kinds are stored in the storage levels. This means that specific goods are stored on a first storage level but not a second storage level, and vice versa. Hence, without a vertical transport of specific goods, the respective goods are only accessible via a first travel surface segment level but not via a second travel surface segment level, and vice versa. This is of advantage whenever a very large number of different goods are stored in the picking system. Yet it is also conceivable that the kinds of goods in multiple and in particular in all storage levels are the same. This means that all kinds of goods are accessible via multiple/all travel surface segment levels without a vertical transport of the respective goods. This is of advantage whenever relatively few different goods are stored in the picking system, as this enables the processes in the picking system to be designed in a more flexible manner. This is true in particular whenever only a part of the travel surface segment levels is operated (e.g. in the partial-load range or in case of a fault). This variant is hence particularly fail-safe and efficient, as vertical transport operations of goods are avoidable in principle.

It is also particularly advantageous if there are different temperatures at least in a part of the travel surface segments arranged on different levels and in particular there is a lower temperature on a bottom travel surface segment than on a top travel surface segment. In this way, the natural thermal stratification can be used to operate the picking system in an energy-efficient manner.

In addition, it is advantageous if a short-term intermediate storage area/buffer is arranged in the region of a travel surface segment. This has advantages for the sequencing of the ordered goods, in particular whenever the ordered goods in case of a relatively comprehensive order are removed in a chaotic manner or with only a low degree of sorting and the sequencing is carried out in full or in essence by the autonomous conveying vehicles. The transfer of the goods/ordered goods from and to the autonomous conveying vehicles in an absolutely precise sequence is hence not required. Ordered goods which are removed at a very early point in time during the picking process but are loaded onto or into a dispatch goods carrier only relatively late (for example to realize a predetermined packing pattern), can be interim-stored by the autonomous conveying vehicles in the short-term intermediate storage area/buffer and re-collected at a required point in time.

It is further favorable if multiple travel surface segments are structurally separated from one another by storage racks, wherein the storage racks are comprised by the short-term intermediate storage area/buffer or form same and wherein the storage racks are accessible from an adjacent travel surface segment. This results in a double benefit, as the storage racks fulfill, on the one hand, the function of the short-term intermediate storage area/buffer, and, on the other hand, also the function of the structural separation between two travel surface segments.

It is also favorable if multiple travel surface segments are structurally separated from one another by storage racks, wherein the storage racks are comprised by the short-term intermediate storage area/buffer or form same and wherein the storage racks are accessible from multiple adjacent travel surface segments. This enables an exchange of the goods/ordered goods (but not necessarily the autonomous conveying vehicles) between two adjacent travel surface segments. The picking process can hence be done in a very flexible manner.

It is also favorable if
the storage zone comprises storage racks,
storage areas are provided in the storage racks and
a railborne storage-and-retrieval unit is provided, by means of which the storage areas in the storage racks are enterable, wherein the storage conveying device(s) and/or the removal conveying device(s) comprise(s) the storage-and-retrieval unit, and wherein a fixed-installation storage transfer station of a fixed-installation part of the storage conveying device(s) is provided along the route of the storage conveying device(s) upstream of the storage-and-retrieval unit, which is configured for the transfer of the goods from the autonomous conveying vehicles onto the fixed-installation storage transfer station and/or a fixed-installation removal transfer station of a fixed-installation part of the removal conveying device(s) is provided along the route of the removal conveying device(s) downstream of the storage-and-retrieval unit, which is configured for the transfer of the ordered goods from the removal transfer station onto the autonomous conveying vehicles.

In this variant embodiment, the storage conveying device(s) and/or the removal conveying device(s) is/are divided into a fixed-installation, first conveyor section and into a second conveyor section formed by the autonomous conveying vehicles. In this way, the advantages of (a) fixed-installation conveying device(s) can be combined with those of autonomous conveying vehicles. Here, the storage transfer station and the removal transfer station form interfaces between the autonomous conveying vehicles and (a) fixed-installation conveying device(s), and thus "transfer points." In particular, the fixed-installation conveying device(s) can comprise conveyor belts, roller conveyors, lifts and suchlike.

It is finally favorable if at least one workstation for picking the ordered goods into or onto dispatch goods carriers is arranged along the route of the removal conveying device(s). Cardboard boxes or pallets, for example, qualify as dispatch goods carriers. The picking as such can be done in a manual, automated or mixed manner. Also the workstation for picking the ordered goods can form an interface with the autonomous conveying vehicles, and thus a "transfer point."

It also proves advantageous if at least one holding area for provisioning the goods, for example on pallets (delivery containers), and/or at least one separation device (depalletizer) for provisioning separated goods is arranged along the route of the storage conveying device(s).

It should be noted at this point that the variants and advantages disclosed in relation to the method presented equally relate to the picking system presented, and vice versa.

BRIEF DESCRIPTION OF THE DRAWINGS

For the purpose of a better understanding of the invention, the latter will be elucidated in more detail by means of the figures below.

In a strongly simplified, schematic depiction, each figure shows as follows.

DETAILED DESCRIPTION OF THE PREFERRED EMBODIMENTS

First of all, it is to be noted that, in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, and these specifications of location are to be analogously transferred to the new position.

Figure 1:
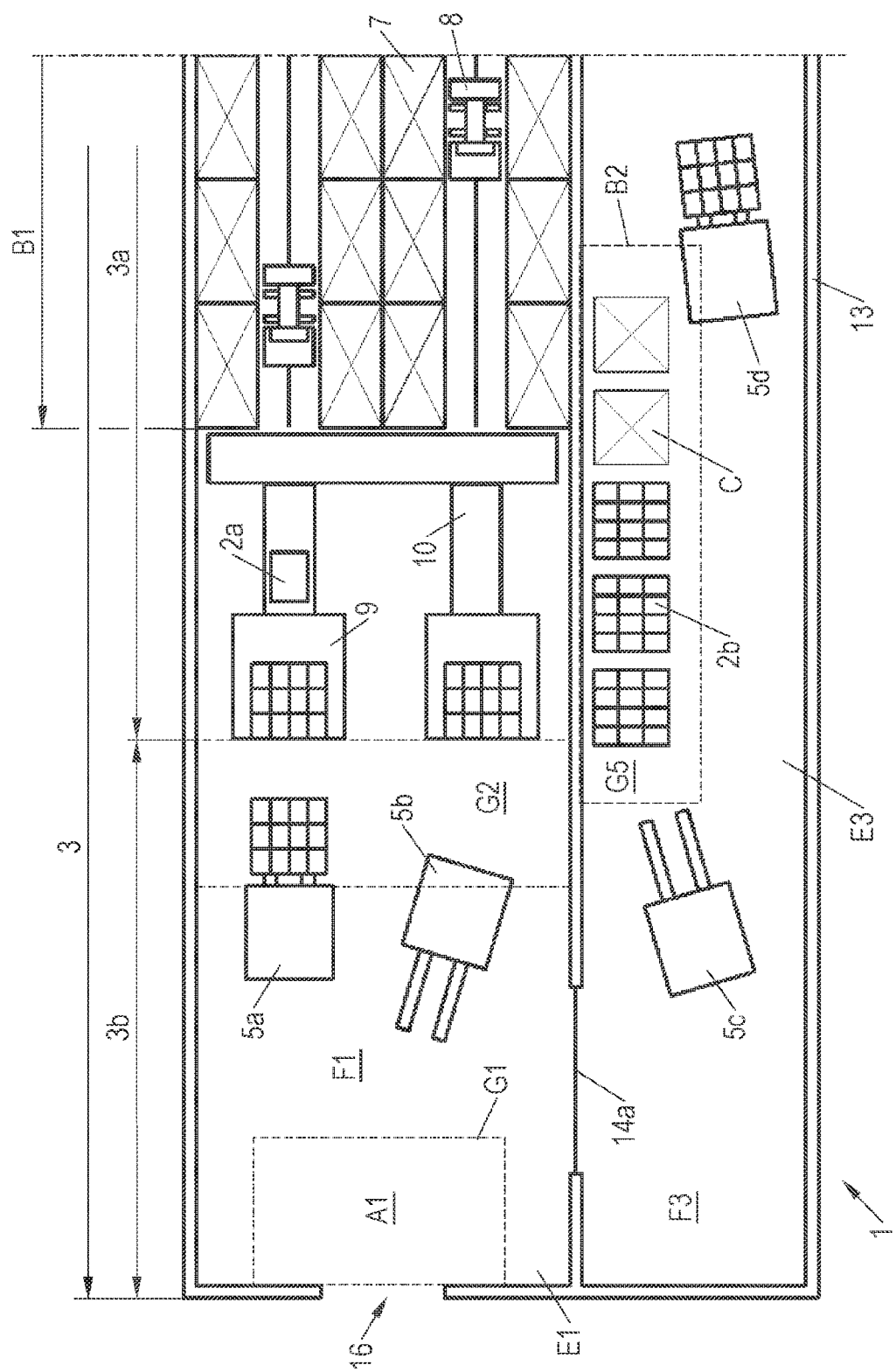
FIG. 1 a first part of an exemplary and schematically depicted picking system.
Figure 2:
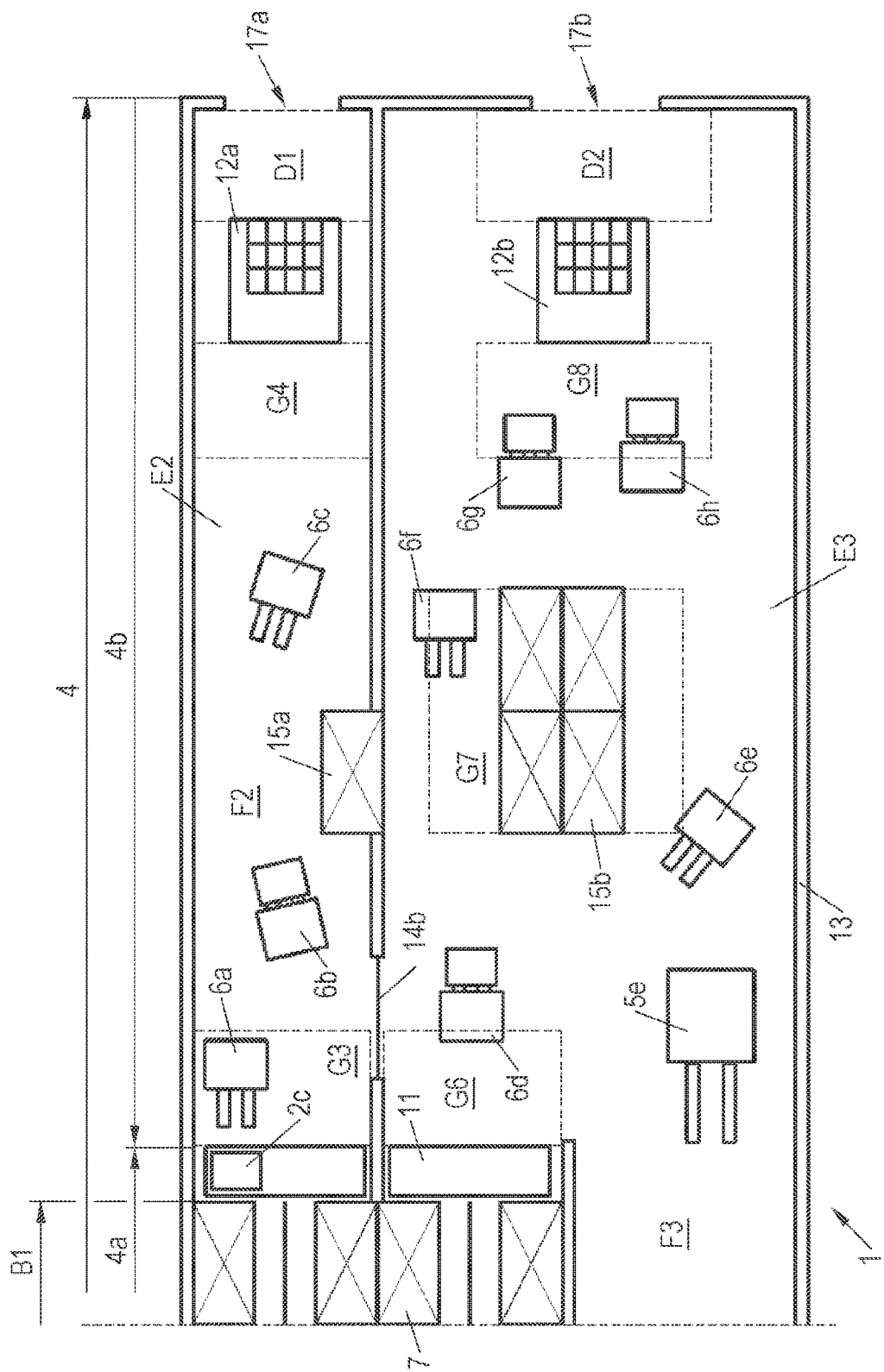
FIG. 2 a second part of the picking system, which abuts on the first part.

The FIGS. 1 and 2 show an exemplary and schematically depicted picking system 1 for picking goods/ordered goods 2a ... 2c. Specifically, the FIG. 1 shows a first part of the picking system 1, and the FIG. 2 shows a second part of the picking system 1, which abuts on the first part.

The picking system 1 comprises a goods acceptance zone A1, two storage zones B1, B2 with a plurality of storage areas C for storing the goods 2a, 2b and two goods transfer zones D1, D2. The picking system 1 further comprises (a) storage conveying device(s) 3 connecting the goods acceptance zone A1 and the storage zones B1, B2, which is/are configured for transporting the goods 2a, 2b from the goods acceptance zone A1 to the storage zones B1, B2 and for storing the goods 2a, 2b into the storage zones B1, B2, as well as (a) removal conveying device(s) 4 connecting the storage zones B1, B2 and the goods transfer zones D1, D2, which is/are configured for removing the ordered goods 2c from the storage zones B1, B2 and for transporting the ordered goods 2c from the storage zones B1, B2 to the goods transfer zones D1, D2. The storage conveying device(s) 3 and/or the removal conveying device(s) 4 has/have a plurality of autonomous conveying vehicles 5a ... 5e, 6a ... 6h for transporting the goods 2a, 2b/ordered goods 2c on a travel surface. Finally, the picking system 1 comprises an order processing computer for registering a picking order and for determining ordered goods 2c which are required for the picking order.

In the specifically depicted example, the first storage zone B1 comprises multiple storage racks 7 with a plurality of storage areas (not depicted in detail). Railborne storage-and-retrieval units 8 drive between the storage racks 7, by means of which railborne storage-and-retrieval units 8 the storage areas in the storage racks 7 are enterable and which are both part of the first storage zone B1 and of the storage conveying device(s) 3 and/or of the removal conveying device(s) 4.

Fixed-installation storage transfer stations are provided along the route of the storage conveying device(s) 3 upstream of the storage-and-retrieval units 8, which fixed-installation storage transfer stations are configured as depalletizers 9 in the specific example. The storage transfer stations/depalletizers 9 are connected via storage roller conveyors 10 with the first storage zone B1 and/or the storage-and-retrieval units 8, which are preferably configured as multi-level storage-and-retrieval units. The storage transfer stations/depalletizers 9 are configured for accepting the goods 2a from the autonomous conveying vehicles 5a, 5b and, together with the storage roller conveyor 10, form a fixed-installation part 3a of the storage conveying device(s) 3. In contrast to this, the autonomous conveying vehicles 5a, 5b form a non-fixed-installation part 3b of the storage conveying device(s).

Fixed-installation removal transfer stations 11 are provided along the route of the removal conveying device(s) 4 downstream of the storage-and-retrieval units 8, which fixed-installation removal transfer stations 11 are connected via the storage-and-retrieval units 8 with the first storage zone B1. The removal transfer stations 11 are configured for transferring the ordered goods 2c onto the autonomous conveying vehicles 6a ... 6c and form a fixed-installation part 4a of the removal conveying device(s) 4. In contrast to this, the autonomous conveying vehicles 6a ... 6c form a non-fixed-installation part 4b of the removal conveying device(s) 4.

The storage-and-retrieval units 8 are both part of the fixed-installation storage conveying device(s) 3a and part of the fixed-installation removal conveying device(s) 4a. The storage transfer stations 9 and the removal transfer stations 11 form interfaces between the autonomous conveying vehicles 5a, 5b, 6a ... 6c and the fixed-installation storage conveying device(s) 3a and the fixed-installation removal conveying device(s) 4a, and thus "transfer points." In particular, the fixed-installation conveying device(s) 3a, 4a can comprise not only, as depicted, a storage roller conveyor 10, storage transfer stations 9, removal transfer stations 11 and storage-and-retrieval units 8, but, for example, also conveyor belts, lifts and suchlike.

The procedure for picking goods/ordered goods 2a ... 2c is as follows:

The goods 2a, 2b are accepted by the autonomous conveying vehicles 5a, 5b in the goods acceptance zone A1 and transported to the storage transfer stations/depalletizers 9, where the goods 2a, 2b delivered in pallets are separated. By means of the storage roller conveyor 10 and the storage-and-retrieval units 8, the separated goods 2a are stored into the first storage zone B1.

When a picking order is registered, the ordered goods 2c which are required for the picking order are determined. The "goods" 2a then become "ordered goods" 2c. Subsequently, the ordered goods 2c are removed with the help of the storage-and-retrieval units 8 from the first storage zone B1 and transported to the removal transfer stations 11. There, they are accepted by the conveying vehicles 6a ... 6h and transported to the palletizers 12a, 12b, which compile the separated ordered goods 2c into an order and/or into orders. The order compiled, for example, on a pallet or another dispatch goods carrier is then provisioned for pick-up at the goods transfer zone D1, D2.

The palletizers 12a, 12b generally form a workstation for picking the ordered goods 2c into or onto dispatch goods carriers. Yet it is also conceivable that the workstation for picking is configured for manual picking. Also, a mixed work process is conceivable in principle. Cardboard boxes or pallets, for example, qualify as dispatch goods carriers.

It is also conceivable that an order (only or additionally) contains goods 2b which need not be separated but can be transported directly from the goods acceptance zone A1 to the second storage zone B2 and from there to the goods transfer zone D2 ("cross-docking goods"). A depalletizing and subsequent palletizing is obsolete with these goods 2b.

Therefore, the goods 2a are stored separated in a first storage zone B1 and the goods 2b are stored in groups, in particular on pallets, in a second storage zone B2. Such a procedure is particularly advantageous whenever orders (more often than not) also comprise groups of ordered goods, in particular complete pallets of these ordered goods. Yet it is also conceivable that only separated ordered goods 2c or only ordered goods in groups are compiled into an order in the picking plant 1. It is also conceivable that goods 2a, 2b are stored separated and in groups in a joint storage zone.

It should further be noted that, in the present example, the goods/ordered goods 2a, 2b are transported by the autonomous conveying vehicles 5a, 5b only in groups, in particular on pallets, in the first travel surface segment E1, whereas the autonomous conveying vehicles 6a ... 6c transport the goods/ordered goods 2c in the second travel surface segment E2 only separated. The autonomous conveying vehicles 5a, 5b which convey groups of goods/ordered goods 2a, 2b, are, as a general rule, slower than autonomous conveying vehicles 6a ... 6c which are designed for the transport of individual goods/ordered goods 2c. The proposed measures ensure that obstructions of the faster autonomous conveying vehicles 6a . . . 6c by the slower autonomous conveying vehicles 5a, 5b are avoided. Accordingly and preferably, autonomous conveying vehicles 5a, 5b with a first maximum speed operate in a first travel surface segment E1 and autonomous conveying vehicles 6a . . . 6c with a second, different maximum speed operate in a second travel surface segment E2.

Preferably, autonomous conveying vehicles 5a, 5b of a first design furthermore operate in a first travel surface segment E1 and autonomous conveying vehicles 6a . . . 6c with a second, different design operate in a second travel surface segment E2. For example, the autonomous conveying vehicles 5a, 5b, 6a . . . 6c can have transport platforms of different sizes and/or accommodate different rated loads.

In the third travel surface segment E3, the goods/ordered goods 2b, 2c are transported both separated and in groups by the autonomous conveying vehicles 5c . . . 5e, 6d . . . 6h. This enables the compilation of a shipment in a particularly flexible manner.

It is also conceivable that the variants specified above in relation to the separated good(s)/ordered good(s) 2a . . . 2c are applied to small groups of goods/ordered goods 2a . . . 2c. Accordingly, the goods/ordered goods 2a . . . 2c can be transported in groups of different sizes by the autonomous conveying vehicles 5c . . . 5e, 6d . . . 6h in a travel surface segment E1 . . . E3. It is also conceivable that the goods/ordered goods 2a . . . 2c are transported by the autonomous conveying vehicles 5c . . . 5e, 6d . . . 6h in a first group size in a first travel surface segment E1 . . . E3 and in another group size in a second travel surface segment E1 . . . E3. In this case, the group size is determined by the number of members of a group.

In the region of a travel surface segment, also a short-term intermediate storage area/buffer can be arranged. Specifically, in this example, a short-term intermediate storage area 15a formed by one storage rack is provided in the second travel surface segment E2 and a short-term intermediate storage area 15b formed by multiple storage racks is provided in the third travel surface segment E3. Short-term intermediate storage areas/buffers 15a, 15b have advantages for the sequencing of the ordered goods 2c, in particular whenever the ordered goods in case of a relatively comprehensive order are removed in a chaotic manner or with only a low degree of sorting and the sequencing is carried out in full or in essence by the autonomous conveying vehicles 5c . . . 5e, 6d . . . 6h. Ordered goods 2c which are removed at a very early point in time during the picking process but are loaded onto or into a dispatch goods carrier only relatively late (for example to realize a predetermined packing pattern), can be interim-stored by the autonomous conveying vehicles 5c . . . 5e, 6d . . . 6h in the short-term intermediate storage area/buffer 15a, 15b and re-collected again at a required point in time.

The short-term intermediate storage area 15a constitutes a special case, as it also forms the structural separation between the second travel surface segment E2 and the third travel surface segment E3. In the example shown, the short-term intermediate storage area 15a can be accessible only from the second travel surface segment E2, only from the third travel surface segment E3 or both from the second travel surface segment E2 and from the third travel surface segment E3. In the latter case, an exchange of the ordered goods 2c between the adjacent travel surface segments E2 and E3 is possible without autonomous conveying vehicles 5c . . . 5e, 6d . . . 6h having to change the travel surface segments E2 and E3 to that end. The picking process can hence be done in a very flexible manner.

The autonomous conveying vehicles 5a . . . 5e, 6a . . . 6h quite generally move on multiple travel surface segments E1 . . . E3, which together form the travel surface for the autonomous conveying vehicles 5a . . . 5e, 6a . . . 6h. The travel surface is also subdivided into multiple travel surface segments E1 . . . E3. With the help of a (superordinate) control, the driving movements of the autonomous conveying vehicles 5a . . . 5e, 6a . . . 6h are co-ordinated in such a way that driving movements in the travel surface segments E1 . . . E3 are each for the most part carried out by a closed group of autonomous conveying vehicles 5a . . . 5e, 6a . . . 6h.

In the depicted example, the travel surface segments E1 . . . E3 are structurally separated, specifically by the walls 13 of the building in which the picking system 1 is arranged. In this way, it can be excluded that an autonomous conveying vehicle 5a . . . 5e, 6a . . . 6h (inadvertently) changes from a travel surface segment E1 . . . E3 onto another travel surface segment E1 . . . E3.

In one variant, an exchange of autonomous conveying vehicles 5a . . . 5e, 6a . . . 6h between different groups and between different travel surface segments E1 . . . E3 is entirely excluded. The gates 14a, 14b arranged between the travel surface segments E1 . . . E3 then remain closed or can be replaced by the wall 13. The driving movements of the autonomous conveying vehicles 5a . . . 5e, 6a . . . 6h are then particularly easy to plan and co-ordinate. Connecting paths are then obsolete.

Yet it is also conceivable that an exchange of autonomous conveying vehicles 5a . . . 5e, 6a . . . 6h between different groups and between different travel surface segments E1 . . . E3 is enabled to a small extent. The gates 14a, 14b are then opened as needed or can also be constantly open. This ensures that, for example, autonomous conveying vehicles 5a . . . 5e, 6a . . . 6h not required in one group are made available in another group in which there is a (temporary) bottleneck of autonomous conveying vehicles 5a . . . 5e, 6a . . . 6h. Yet the changeover of autonomous conveying vehicles 5a . . . 5e, 6a . . . 6h from one travel surface segment E1 . . . E3 onto another need not serve the capacity adjustment but can also be part of the picking process. For example, it could be provided that the autonomous conveying vehicles 5a, 5b also drive into the travel surface segment E3 to deposit, there, goods 2b in the second storage zone B2.

An exchange of autonomous conveying vehicles 5a . . . 5e, 6a . . . 6h between two different travel surface segments E1 . . . E3 (during normal operation of the picking system 1) concerns a maximum of 10%, advantageously a maximum of 5%, of the journeys carried out on the travel surface.

The proposed measures ensure that the driving movements are easy to plan and co-ordinate despite high traffic density and that the collision probability/obstruction probability/control probability and the collision rate/obstruction rate/control rate can be reduced considerably compared to systems according to the prior art.

Generally, a travel surface segment E1 . . . E3 can be subdivided into transfer zones and travel zones. Transfer zones surround transfer points, which constitute interfaces between the autonomous conveying vehicles 5a . . . 5e, 6a . . . 6h with (a) fixed-installation conveying device(s) 3a, 4a or interfaces between the autonomous conveying vehicles 5a . . . 5e, 6a . . . 6h with storage zones B1, B2. In contrast to this, in travel zones, a transfer between autonomous conveying vehicles 5a . . . 5e, 6a . . . 6h and (a) fixed-installation conveying device(s) 3a, 4a or between autonomous conveying vehicles 5a . . . 5e, 6a . . . 6h and a storage zone B1, B2 is not possible.

In the example shown, the first travel surface segment E1 has the travel zone F1 and the transfer zones G1 (corresponding to the goods acceptance zone A1) and G2, the second travel surface segment E2 has the travel zone F2 and the transfer zones G3, G4 and the third travel surface segment E3 has the travel zone F3 and the transfer zones G5 . . . G8.

The transfer points and transfer zones G1 . . . G8 form those points on the travel surface to which the autonomous conveying vehicles 5a . . . 5e, 6a . . . 6h necessarily drive as per their intended use. Hence, accumulations of autonomous conveying vehicles 5a . . . 5e, 6a . . . 6h and/or high vehicle density occur in particular at these transfer points/transfer zones G1 . . . G8. Accordingly, the collision rate/obstruction rate/control rate and the collision probability/obstruction probability/control probability are also relatively high there. In the travel zone F1 . . . F3, the vehicle density and also the collision rate/obstruction rate/control rate and the collision probability/obstruction probability/control probability, as a general rule, is lower than in the transfer points/transfer zones G1 . . . G8. As a rule, the borders between a transfer zone G1 . . . G8 and a travel zone F1 . . . F3 are fluent and a sudden change of the vehicle density will not occur but a gradual change.

It is advantageous here if a relation between a number of the autonomous conveying vehicles 5c . . . 5e, 6d . . . 6h located on a travel surface segment E1 . . . E3 and a number of transfer points on this travel surface segment E1 . . . E3 is below 5. This ensures that the collision rate/obstruction rate/control rate and the collision probability/obstruction probability/control probability in the transfer zones G1 . . . G8 can be maintained at an acceptable value.

In addition to the easy plannability and co-ordination of the driving movements, a particular advantage of the segmentation of the travel surface lies also in the fact that the normal operation in case of a failure of specific travel surface segments E1 . . . E3 can be perpetuated in those travel surface segments E1 . . . E3 where no failure has occurred. In case of failure or in case of maintenance, the access for individuals to travel surface segments E1 . . . E3 the access to which is blocked during normal operation can be released, for example to enable the rectification of the failure and/or maintenance of the picking system 1. To that end, the conveying vehicles 5a . . . 5e, 6a . . . 6h can be slowed down or stopped. The segmentation ensures that a reduction of the travel speed of the autonomous conveying vehicles 5a . . . 5e, 6a . . . 6h or a stopping of same has a much smaller effect on the overall performance of the picking system 1 in case of failure than in an unsegmented travel surface according to the prior art.

Even during normal operation, some travel surface segments E1 . . . E3 can be free for the access by persons, whereas other travel surface segments E1 . . . E3 are blocked from the access by persons during normal operation. For example, the travel surface segments E1 and E3 could be blocked from access by individuals during normal operation because of the relatively heavy and thus potentially dangerous autonomous conveying vehicles 5a . . . 5e, whereas the travel surface segment E2 can be open to access by individuals during normal operation because of the relatively light-weight and thus less dangerous autonomous conveying vehicles 6a . . . 6h. Further criteria for differentiating the access by individuals are, among other things, the speed of an autonomous conveying vehicle 5a . . . 5e, 6a . . . 6h or the kind of sensor system for navigation and avoidance of collision.

The normal operation can, in addition, be interrupted by a change of the operating mode of the picking system 1, for example to adjust the picking system 1 to different performance requirements.

The capacity adjustment and/or the change of the operating mode can be associated with the temporary shut-down and/or temporary putting into operation of parts of the picking system 1, in particular with the temporary shut-down and/or temporary putting into operation of travel surface segments E1 . . . E3. For example, in the example shown, in particular the second travel surface segment E2 can be put out of operation in times of a lower performance requirement, as the picking of (a) separated good(s) 2c executed there can, in principle, also be executed in the third travel surface segment E3. This enables the picking system 1 to be operated at high efficiency even during lower system performance.

It is further conceivable that, during a change of the operating mode of the picking system 1, autonomous conveying vehicles 5a . . . 5e, 6a . . . 6h of switched-off travel surface segments E1 . . . E3 are used, at least in part, in the travel surface segments E1 . . . E3 remaining active. For example, during a switch-off of the second travel surface segment E2, the autonomous conveying vehicles 6a . . . 6c could change, at least in part, into the third travel surface segment E3 to "assist" there. This ensures that the capacity in the third travel surface segment E3 is increased, so that the loss of capacity in the picking system 1 is reduced during the switch-off of the second travel surface segment E2. This ensures that the capacity adjustment in the picking system 1 can be done in a finely graded manner.

In the transit phases between the individual operating modes, an exchange of autonomous conveying vehicles 5a . . . 5e, 6a . . . 6h between two different travel surface segments E1 . . . E3 is conceivable which exchange exceeds the limit of a maximum of 10% of the journeys carried out on the travel surface that exists during normal operation of the picking system 1. In these transit phases, even 100% of the journeys carried out on the travel surface can concern an exchange of autonomous conveying vehicles 5a . . . 5e, 6a . . . 6h between two different travel surface segments E1 . . . E3. The transit phase is not necessarily a period of time that is globally valid for the entire picking system 1, but transit phases between different pairs of travel surface segments E1 . . . E3 can, for example, also occur at different points in time and have different durations. This means that a change of an operating mode can concern a just locally-limited part of the picking system 1.

It is further conceivable that (a) fixed-installation conveying device(s) 3a, 4a leading toward the travel surface segments E1 . . . E3 or (a) fixed-installation conveying device(s) 3a, 4a leading away from the travel surface segments E1 . . . E3 supplies/supply only those travel surface segments E1 . . . E3 which are actually operated on the basis of the current capacity need. For example, during a switch-off of the second travel surface segment E2, that/those fixed-installation conveying device(s) 3a, 4a which supplies/supply the travel surface segment E2 can be deactivated. This is specifically the top one of the two depalletizers 9 depicted in FIG. 1, the top branch of the storage roller conveyor 10, the top storage-and-retrieval unit 8 and the top removal transfer station 11.

It is particularly advantageous in this context if the kinds of goods 2a, 2b which are stored in a storage zone B1, B2 connected with a travel surface segment E1 . . . E3 via the storage/removal conveying device(s) 3, 4 are the same for all travel surface segments E1 . . . E3. This means that all kinds of goods 2a, 2b are accessible via all travel surface segments E1 . . . E3. This ensures that also in the partial-load range or in case of a fault (i.e. for example during a switch-off of the second travel surface segment E2) all kinds of goods 2a, 2b are processed in the picking system 1.

Another effect during the (temporary) switch-off of travel surface segments E1 . . . E3 is that not only energy for the storage/removal conveying device(s) 3, 4 can be saved but also for auxiliary units such as lighting system and heating system/cooling system.

For example, it can be provided that there are different temperatures in the travel surface segments E1 . . . E3. For example, in one travel surface segment E1 . . . E3 frozen goods 2a . . . 2c can be moved and in another travel surface segment goods/ordered goods 2a . . . 2c to be stored at room temperature can be moved. When, for example, frozen good(s) 2a, 2b is/are processed in the second travel surface segment E2, also the temperature in the second travel surface segment E2 can be raised temporarily during a switch-off of same for the purpose of the saving of energy.

When there are different temperatures in the travel surface segments E1 . . . E3, the autonomous conveying vehicles 6a . . . 6h can also be designed for different temperature ranges. For example, the autonomous conveying vehicles 6a . . . 6c driving in the second travel surface segment E2 can be configured in a different manner than the autonomous conveying vehicles 6d . . . 6h driving in the third travel surface segment E3 despite having the same rated load.

It should finally be noted as an addition that the goods acceptance zone A1 in this example is located directly at the goods-in point 16 and the goods transfer zones D1, D2 are located directly at the goods-out points 17a, 17b. While this is advantageous, it is not a mandatory requirement. It would also be conceivable that the goods acceptance zone A1 and/or the goods transfer zones D1, D2 are located at a different location of the picking system 1.

Figure 3:
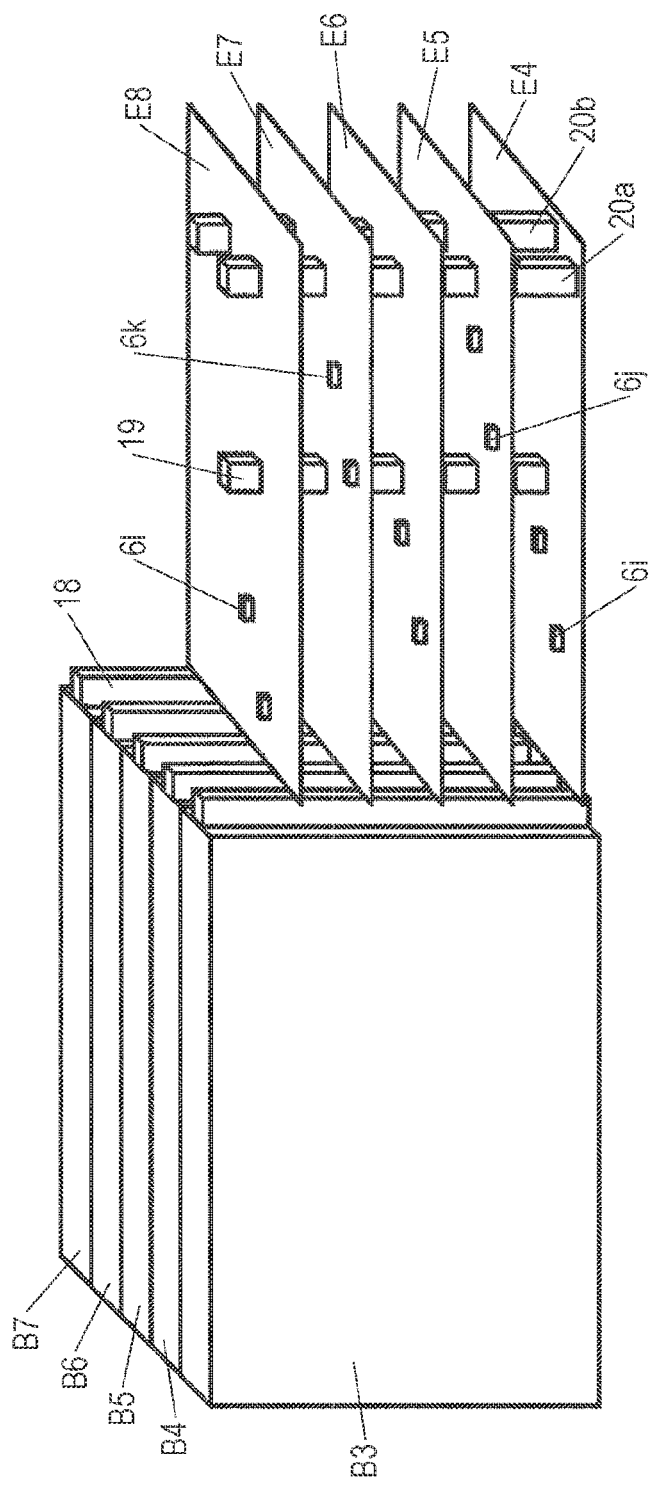
FIG. 3 a detail of an exemplary and schematically depicted picking system with travel surface segments arranged on top of one another.

The FIG. 3 shows a detail from a further exemplary and schematically depicted picking system. In contrast to the picking system 1 depicted in the FIGS. 1 and 2, travel surface segments E4 . . . E8 with autonomous conveying vehicles 6i . . . 6l are not arranged next to one another but vertically on top of one another here. Multiple storage zones B3 . . . B7 with a plurality of storage areas C are connected with the travel surface segments E4 . . . E8 via lifts 18, which storage zones B3 . . . B7 are configured in this example for transporting (a) separated ordered good(s) 2c between the storage zones B3 . . . B7 and the travel surface segments E4 . . . E8. Storage-and-retrieval units 8 can be provided in the storage zones B3 . . . B7, as this is the case in the example depicted in the FIGS. 1 and 2. Because of the lifts 18, these are preferably configured as single-level-storage-and-retrieval units ("shuttles"). The arrangement further comprises a lift 19 which is configured for transporting autonomous conveying vehicles 6i . . . 6l between the travel surface segments E4 . . . E8. Finally, the arrangement also comprises two lifts 20a, 20b which are configured for the transport of groups of ordered goods 2c between the travel surface segments E4 . . . E8, i.e. for example for the vertical transport of pallets.

The function of the arrangement depicted in the FIG. 3 is analogous to the picking system 1 depicted in the FIGS. 1 and 2, wherein it is assumed henceforth that the arrangement shown shows the removal-side region of the picking system.

Here, too, a picking order is registered, and the ordered goods 2c required for the picking order are determined. Subsequently, the ordered goods 2c are removed from the storage zone B3 . . . B7 with a storage-and-retrieval unit 8 and, if applicable, transported into the travel surface segments E4 . . . E8 with the lift 18. There, the ordered goods 2c are brought with the help of the autonomous conveying vehicles 6i . . . 6l to a workstation for picking the ordered goods 2c, where they are loaded into or onto dispatch goods carriers. For example, this can be done manually or, again, with palletizers 12a, 12b (not depicted). From there, the ordered goods 2c ready to be dispatched are brought to a goods transfer zone D1, D2 and/or goods-out point 17a, 17b. For example, this can be done via the lifts 20a, 20b if the goods transfer zone D1, D2/goods-out point 17a, 17b is arranged on the ground floor, as this is assumed for the present example. In principle, the goods transfer zones D1, D2/goods-out points 17a, 17b could also be arranged in another level or on different levels.

The arrangement of the workstations for picking on the travel surface segments E4 . . . E8 can in principle be done in different manners. For example, it can be provided that one workstation for picking each is provided per travel surface segment E4 . . . E8. It is also conceivable that a workstation for picking is provided only in some of the travel surface segments E4 . . . E8, in particular only in one of the travel surface segments E4 . . . E8. Finally, it would also be conceivable that there are multiple workstations for picking in one travel surface segment E4 . . . E8.

Driving movements in travel surface segments E4 . . . E8, again, are each carried out for the most part by a closed group of autonomous conveying vehicles 6i . . . 6l. An exchange of autonomous conveying vehicles 6i . . . 6l between two different travel surface segments E4 . . . E8 during normal operation of the picking system concerns, again, a maximum of 10%, advantageously a maximum of 5%, of the journeys carried out on the travel surface. An exchange of the autonomous conveying vehicles 6i . . . 6l can be done as needed via the lift 19, which, in functional terms, takes the place of the gates 14a, 14b. An exchange of the autonomous conveying vehicles 6i . . . 6l can, again, be done in particular in case of a failure or in case of a switch-over of the operating mode of the picking system. If an exchange of the autonomous conveying vehicles 6i . . . 6l is not provided, the lift 19 is also obsolete.

The autonomous conveying vehicles 6i . . . 6l driving on the travel surface segments E4 . . . E8 can also be of different designs. For example, the conveying vehicles 6i driving on the travel surface segment E4 could be structured differently than the conveying vehicles 6l driving on the travel surface segment E8. The autonomous conveying vehicles 6i . . . 6l driving on the travel surface segments E4 . . . E8 can be different, for example, with regard to their maximum speed and/or for the temperature range, for which they are designed. For example, this is, again, of advantage whenever there are different temperatures in the travel surface segments E4 . . . E8. In this case, it is particularly advantageous if there is a lower temperature on a bottom travel surface segment E4 than on a top travel surface segment E8, as, in this way, the natural thermal stratification can be used to operate the picking system in an energy-efficient manner Also what has been said with regard to the access for individuals to the travel surface segments E1 . . . E3 is applicable unrestrictedly also to the travel surface segments E4 . . . E8. For example, some travel surface segments E4 . . . E8 can be free for the access of persons, whereas other travel surface segments E4 . . . E8 are blocked from the access by persons. In particular, this also concerns what has been said with regard to the case of failure. Evidently, in the arrangement shown in FIG. 3, the normal operation can also be perpetuated in those travel surface segments E4 . . . E8 in which no failure has occurred, whereas the autonomous conveying vehicles 6*i* . . . 6*l* in a travel surface segment E4 . . . E8 in which a failure has occurred are slowed down or stopped.

In principle, the travel surface segments E4 . . . E8 in the example depicted in FIG. 3 are structurally separated from one another by their special arrangement on top of one another. Yet, in principle, also a further subdivision into travel surface segments could be done in a level, for example such as this is the case for the travel surface segments E1 . . . E3 of the picking system 1 depicted in the FIGS. 1 and 2. The structural separation could then, again, be done by a wall 13 or a short-term intermediate storage area/buffer 15*a* situated between two travel surface segments E1, E3. Also the use of an intermediate storage area/buffer 15*b* situated in the travel surface segment E3 is possible unrestrictedly in the arrangement depicted in FIG. 3.

In the arrangement depicted in FIG. 3, in addition to the processing of (a) separated ordered good(s) 2*c*, the processing of ordered goods 2*c* in groups can also be provided. In addition to the storage zones B3 . . . B7 for separated goods 2*a*, also storage zones for groups of ordered goods 2*c* can be provided. It can further be provided that the ordered goods 2*c* are transported by the autonomous conveying vehicles 6*i* . . . 6*l* only in groups, in particular on pallets, in a first travel surface segment E4 . . . E8 and only separated in a second travel surface segment E4 . . . E8. Furthermore, it can be provided that the goods/ordered goods 2*b*, 2*c* are transported both separated and in groups, in particular on pallets, by the autonomous conveying vehicles 6*i* . . . 6*l* in a travel surface segment E4 . . . E8.

Also what has already been said in relation to the transfer points, transfer zones and travel zones unrestrictedly applies also to the arrangement depicted in the FIG. 3, in particular with regard to a collision rate/obstruction rate/control rate and a collision probability/obstruction probability/control probability. It should be noted in this context that the crossing points of the lifts 18, 19, 20*a* and 20*b* with the travel surface segments E4 . . . E8, as a general rule, form interfaces between the autonomous conveying vehicles 6*i* . . . 6*l* and the fixed-installation removal conveying device(s) 4*a*, and thus transfer points.

The arrangement of the travel surface segments E4 . . . E8 in levels at different heights ensures that the picking system presented is easily expandable. For example, if it emerges during the operation of the picking system that the capacity of the autonomous conveying vehicles 6*i* . . . 6*l* is not sufficient (any more) for the demanded picking performance, the picking performance can be increased in a simple manner by adding further travel surface levels E4 . . . E8. It is also particularly advantageous in this context that the storage zones B3 . . . B7 existing in a picking system, as a rule, are configured very high and that no structural alteration of the exterior shell of the building of the picking system is required when adding further travel surface levels E4 . . . E8. In addition, in case of a vertical segmentation of the travel surface, the exterior shell of the building comes very close to a cubic shape, which is advantageous for the need of material required for the erection of the building and for the heating/cooling need of the building. When a further travel surface segment level E4 . . . E8 is added, also additional transfer points are "automatically" created, whereby the capacity of the added travel surface segment E4 . . . E8 is essentially identical to the capacity of another (already existing) travel surface segment E4 . . . E8.

With regard to the storage of goods 2*a*, multiple strategies are conceivable in principle. (A) good(s) 2*a* can be stored in the picking system in such a way that, at least in part, goods 2*a* of different kinds are stored in the levels of the storage zones B3 . . . B7. This means that specific goods 2*a* are stored on a first level of the storage zones B3 . . . B7 but not on a second level of the storage zones B3 . . . B7, and vice versa. Hence, without a vertical transport with the lift 18, specific goods 2*a* are only accessible via a first travel surface segment level E1 . . . E8 but not via a second travel surface segment level E1 . . . E8, and vice versa. This is of advantage whenever a very large number of different goods 2*a* are stored in the picking system. Yet it is also conceivable that the kinds of goods 2*a* in multiple and in particular in all levels of the storage zones B3 . . . B7 are the same. This means that all kinds of goods 2*a* are accessible via multiple/all travel surface segment levels E1 . . . E8 without a vertical transport with the lift 18. This is of advantage whenever relatively few different goods 2*a* are stored in the picking system, as this enables the processes in the picking system to be designed in a more flexible manner. This is true in particular whenever only a part of the travel surface segment levels E1 . . . E8 is operated (e.g. in the partial-load range or in case of a fault). This variant is hence particularly fail-safe and efficient, as vertical transport operations of goods 2*a* are avoidable in principle.

What has been said with regard to the handling of a case of failure and to the change of the operating mode in the context of a capacity adjustment applies unrestrictedly also to the arrangement depicted in FIG. 3.

When travel surface segments E4 . . . E8 are shut down or put into operation on the basis of a capacity need from the picking system, it is of advantage if
- a first travel surface segment E4 . . . E8 is put out of operation before a second travel surface segment E4 . . . E8 when a transport path on (a) fixed-installation removal conveying device(s) 4*a* running between a storage area C and a transfer point in the first travel surface segment E4 . . . E8 is longer than a transport path on the fixed-installation removal conveying device(s) 4*a* running between this storage area C and a transfer point in the second travel surface segment E4 . . . E8 and/or
- a first travel surface segment E4 . . . E8 is put into operation after a second travel surface segment E4 . . . E8 when a transport path on (a) fixed-installation removal conveying device(s) 4*a* running between a storage area C and a transfer point in the first travel surface segment E4 . . . E8 is longer than a transport path on the fixed-installation removal conveying device(s) 4*a* running between this storage area C and a transfer point in the second travel surface segment E4 . . . E8.

If, in a phase of a low performance requirement, all required ordered goods 2*c* are available, for example in that level of the storage zones B3 . . . B7 which is allocated to the travel surface segment E5, it is expedient to put out of operation, as needed, first the travel surface segment E8, then the travel surface segment E7 and so on. Expediently, the putting into operation is done in the reverse sequence. The reason is that the (shortest) transport path which runs on the fixed-installation removal conveying device(s) 4*a* from a storage area C in the respective level into the travel surface segment E5, is shorter than a (shortest) transport path running on the fixed-installation removal conveying device(s) 4*a* into the travel surface segment E8 or travel surface segment E7.

If the goods transfer zone D1, D2 is arranged in the level of the travel surface segment E4 and/or if palletizers 12*a*, 12*b* are located only there, it is equally expedient to put out of operation the travel surface segments E4 ... E8, starting with the travel surface segment E8, and to put them into operation again in the reverse sequence, provided that all ordered goods 2*c* required in a phase of a low performance requirement are available in the levels of the storage zones B3 ... B7 situated below each of the travel surface segments E4 ... E8. When the travel surface segment E8 is put out of operation, all ordered goods 2*c* should be available in the levels which are allocated to the travel surface segments E4 ... E7. When the travel surface segment E7 is additionally put out of operation, all ordered goods 2*c* should be available in the levels which are allocated to the travel surface segments E4 ... E6, and so on.

This will result in not only a saving of energy for the fixed-installation removal conveying device(s) 4*a* leading toward a travel surface segment E4 ... E8 or leading away from a travel surface segment E4 ... E8, but also a saving of travel distance and thus a saving of time during the transport of goods itself. This means that ordered goods 2*c* are not transported unnecessarily far, nor for an unnecessarily long time by the fixed-installation removal conveying device(s) 4*a* leading toward a travel surface segment E4 ... E8 or leading away from a travel surface segment E4 ... E8.

To enable this strategy, it is also expedient to store the goods 2*a* toward the top according to their rate of turnover, starting with a high rate of turnover ("fast movers"), so that goods with a low rate of turnover ("slow movers") are stored in the top region.

In essentially equivalent solutions, the travel surface segments E4 ... E8 can also be put out of or into operation randomly or even coincidentally, in particular to achieve an even wear and tear of the autonomous conveying vehicles 6*i* ... 6*l*.

It is also conceivable that specific travel surface segments E4 ... E8 cannot be reached without a lift 18 at all. In this case, said conditions apply to each storage area C in the picking system, as the transport path leading to said travel surface segment E4 ... E8 is longer for all storage areas C in the picking system than the transport path leading to travel surface segments E4 ... E8 which can be reached even without a lift 18.

In particular, the above-mentioned paths are to be generally understood to mean the shortest transport paths each. Furthermore, said conditions apply in particular to each storage area in the picking system.

Of course, the advantageous variants mentioned with regard to the putting out of operation and putting into operation of travel surface segments E4 ... E8 apply not only to travel surface segments E4 ... E8 arranged vertically on top of one another, but also to travel surface segments E1 ... E3 arranged next to one another, such as they are depicted in the FIGS. 1 and 2. However, the transport paths then run (predominantly) horizontally.

The example disclosed in relation to the FIG. 3 relates to the region on the side of the goods-out point of the picking system. Yet, evidently, all aspects mentioned in the example are also unrestrictedly applicable to the region on the side of the goods-in point of the picking system. In this case, merely the transport direction changes (i.e. in the FIG. 3 from left→right to right→left). A depalletizer 9 takes the place of a palletizer 12*a*, 12*b*, the goods acceptance zone A1 takes the place of the goods transfer zone D1, D2, the removing takes the place of the storing, and so on.

It should also be generally noted that palletizers 12*a*, 12*b* and/or depalletizers 9 can be provided in each travel surface segment E4 ... E8 or only in some of them. Preferably, a palletizer 12*a*, 12*b* and/or depalletizer 9 is located in the level of the goods transfer zone D1, D2 and/or goods acceptance zone A1.

In addition, a lift 18, 19, 20*a*, 20*b* can take over joint tasks, even though the tasks for the lifts 18, 19, 20*a*, 20*b* are separated in the example depicted in FIG. 3. For example, the lift 18 could convey (a) separated good(s) 2*a* and (a) group good(s) 2*c*, and the lift 19 could convey both autonomous conveying vehicles 6*i* ... 6*l* and pallets. Also, lifts which can take over all tasks could be used.

Figure 4:
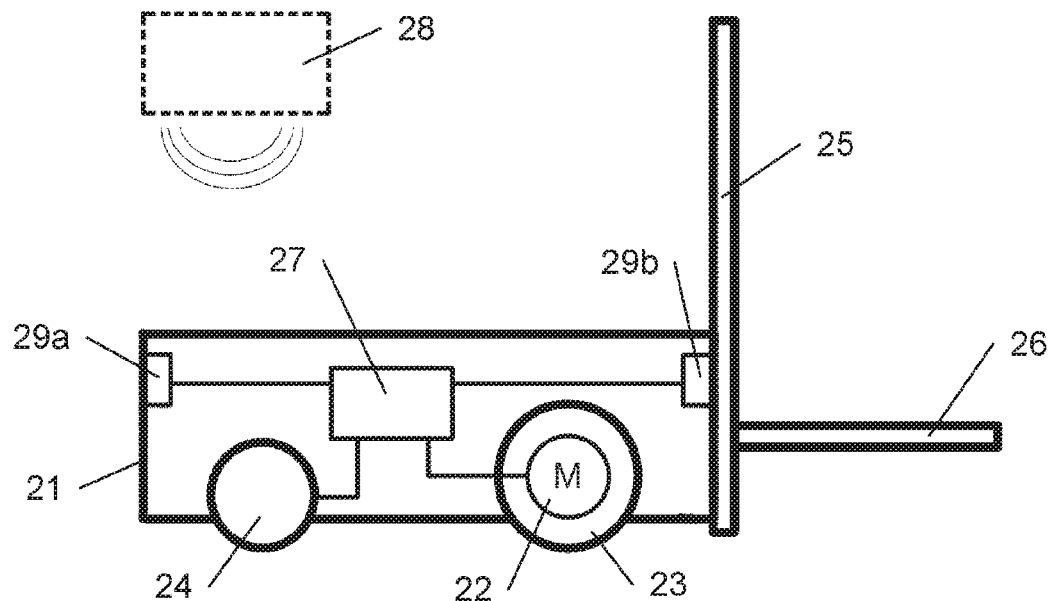
FIG. 4 an exemplary and schematically depicted autonomous conveying vehicle.

FIG. 4 shows a schematically depicted example of an autonomous conveying vehicle 5*a* ... 5*l*, 6*a* ... 6*h*. The autonomous conveying vehicle 5*a* ... 5*l*, 6*a* ... 6*h* has an underframe 21, at which wheels 23, 24 are rotatably mounted. At least one of the wheels 23 is coupled with a drive 22 and at least one of the wheels 24 is steerable. According to the embodiment shown, both wheels 23 are coupled with the drive 22 and are driven by same, and both wheels 24 are steerable wheels. Yet the conveying vehicle 5*a* ... 5*l*, 6*a* ... 6*h* can also comprise only three wheels 23, 24, of which the wheels 23 are driven and the wheel 24 is steerable. In addition, the autonomous conveying vehicle 5*a* ... 5*l*, 6*a* ... 6*h* comprises a transport platform 26, on which the goods/ordered goods 2*a* ... 2*c* to be transported can be accommodated temporarily. According to the embodiment shown, the transport platform 26 is adjustable relative to the underframe 21. To that end, the autonomous conveying vehicle 5*a* ... 5*l*, 6*a* ... 6*h* can have a vertical guidance 25 with a vertically movable transport platform 26 attached to it, as it is depicted in the FIG. 4. The transport platform 26 can also be shiftable laterally and/or toward the front to drop off goods/ordered goods 2*a* ... 2*c* more easily in a storage area C or pick them up more easily from there. Yet the transport platform 26 could also be a fixed, level surface at the autonomous conveying vehicle 5*a* ... 5*l*, 6*a* ... 6*h*. Further, an autonomous conveying vehicle 5*a* ... 5*l*, 6*a* ... 6*h* also comprises a drive control 27 for receiving commands from a superordinate control 28 (which can contain, for example, the order processing computer) and for controlling/regulating the movements of the autonomous conveying vehicle 5*a* ... 5*l*, 6*a* ... 6*h*. Finally, an autonomous conveying vehicle 5*a* ... 5*l*, 6*a* ... 6*h* comprises sensors 29*a*, 29*b* for registering the environment of the autonomous conveying vehicle 5*a* ... 5*l*, 6*a* ... 6*h* and for spatial orientation. The autonomous conveying vehicle 5*a* ... 5*l*, 6*a* ... 6*h* depicted in the FIG. 4 has steerable wheels 24. Yet these wheels are obsolete to the extent that the autonomous conveying vehicle 5*a* ... 5*l*, 6*a* ... 6*h* has wheels with which also a lateral movement can be executed (e.g. Mecanum wheels).

Figure 5:
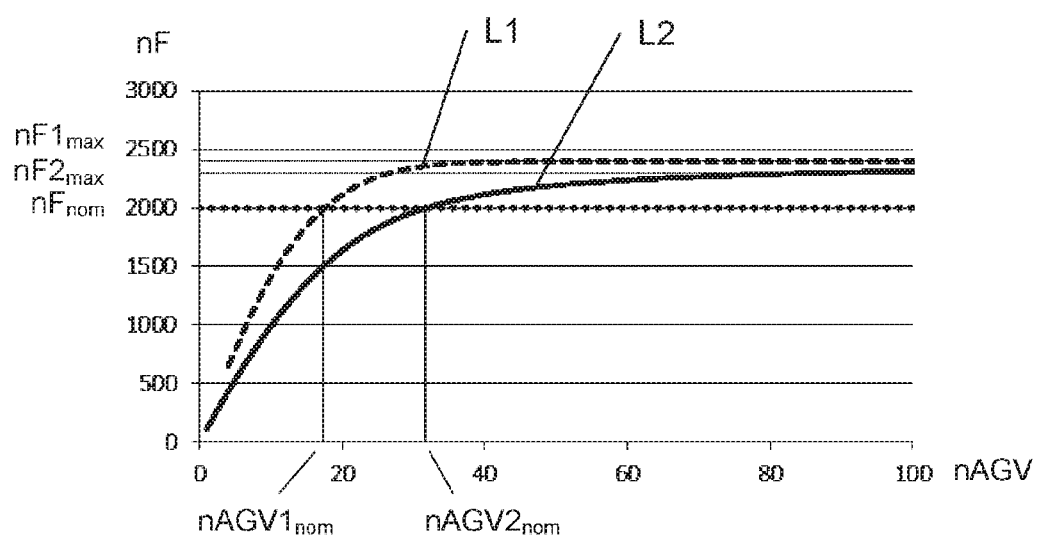
FIG. 5 a diagram in which the capacity of the newly-presented picking system is compared to the capacity of a conventional picking system.

In the FIG. 5, the capacity of the newly proposed picking system with a segmented travel surface is depicted in comparison to a conventional picking system with an unsegmented travel surface. Specifically, the FIG. 5 shows a diagram in which the number of the transport processes/journeys per time (i.e. the throughput) nF is depicted over the number of the autonomous conveying vehicles nAGV. In the diagram, the performance curve L1 of the newly proposed picking system and the performance curve L2 of the conventional picking system are depicted in comparison.

It is assumed in the example that the novel picking system 1 has four travel surface segments E1 ... E8, wherein three starting points and one destination point are provided per travel surface segment E1 ... E8. Therefore, there is a total of twelve starting points and four destination points. For example, removal transfer stations 11 can be provided as starting points and workstations for picking the ordered goods 2c can be provided as end points. At an end point, in particular an (automatic) palletizer 12a, 12b can be provided.

For the conventional picking system, an unsegmented travel surface of the same surface area with the same number of starting points and destination points is provided, i.e. a travel surface with twelve starting points and four destination points.

Under the simplified assumption that the travel surface segments E1 ... E8 and the unsegmented travel surface have a square layout, the new picking system has a maximum travel distance for the autonomous conveying vehicles 5a ... 5l, 6a ... 6h within one travel surface segment E1 ... E8 which maximum travel distance is half as long as the maximum travel distance in the conventional picking system. In this example, in a travel surface segment E1 ... E8 of the new picking system, a maximum travel distance of 10 m is assumed, which corresponds to the diagonal in a travel surface segment E1 ... E8 of a size of around 7×7 m. The travel surface in the conventional picking system is four times as large and therefore has a lateral length of around 14×14 m. The maximum travel distance, i.e. the diagonal in the travel surface, is 20 m. As the vehicle speed in the new and in the conventional picking system is assumed as being the same, the autonomous conveying vehicles 5a ... 5l, 6a ... 6h in the conventional picking system need longer on average for the transport of goods than in the new picking system 1.

It is clearly apparent from the diagram that the throughput nF in the newly proposed picking system 1 in each number of autonomous conveying vehicles 5a ... 5l, 6a ... 6h is higher than that in the conventional picking system. It also becomes apparent from the diagram that the maximum throughput $nF1_{max}$ to be achieved in the new picking system 1 is equally higher than that in the conventional picking system. The maximum throughput to be achieved is around $nF1_{max}=2400$ journeys/h in the new picking system 1 and around $nF2_{max}=2300$ journeys/h in the conventional picking system. Hence, as a matter of principle, the relatively expensive palletizers 12a, 12b can be better utilized in terms of their capacity in the new picking system 1 than in the conventional picking system. The new picking system 1 hence ensures that the costs per picking order are reduced considerably, not only due to the lower need for autonomous conveying vehicles 5a ... 5l, 6a ... 6h, but also because of the better utilization of the palletizers 12a, 12b in terms of their capacity.

Apart from the fact that the new picking system 1, while having the same number of autonomous conveying vehicles 5a ... 5l, 6a ... 6h and the same number of palletizers 12a, 12b, is obviously considerably more efficient than the conventional picking system, there is another essential advantage, namely when it comes to the expansion of a picking system. Picking systems are typically not designed in such a way that they specifically fulfill the requirements of a customer, but they have, as a rule, capacity reserves. In this way, the picking system can be expanded relatively easily in case of an increased capacity need.

In the depicted example, it is assumed that the rated capacity of the picking system on the travel surface is set to $nF_{nom}=2000$ journeys/h. In the conventional picking system, this capacity is achieved with around $nAGV2_{nom}=32$ autonomous conveying vehicles, whereas, in the new picking system 1, it is achieved with as few as $nAGV2_{nom}=18$ autonomous conveying vehicles 5a ... 5l, 6a ... 6h, i.e., by way of calculation, with 4.5 vehicles 5a ... 5l, 6a ... 6h per travel surface segment E1 ... E8. Therefore, in this example, the need for autonomous conveying vehicles 5a ... 5l, 6a ... 6h for the new picking system 1 is just around 56% of the autonomous conveying vehicles required in the conventional picking system. Because of the lower vehicle density in the travel surface segments E1 ... E8, also the collision probability and collision rate is lower in the new picking system 1 than in the conventional picking system.

An increased capacity need can now be met up to a certain degree (specifically up to the maximum throughput $nF1_{max}$ and/or $nF2_{max}$ to be achieved) by adding autonomous conveying vehicles 5a ... 5l, 6a ... 6h. It becomes apparent from the diagram that the gain per added autonomous conveying vehicle 5a ... 5l, 6a ... 6h is considerably larger in the new picking system 1 than in the conventional picking system, as the gradient of the performance curve L1 in the operating point of the new picking system 1 is considerably stronger than in the conventional picking system. This means that the new picking system 1 can be expanded at lower costs than the conventional picking system.

If two autonomous conveying vehicles 5a ... 5l, 6a ... 6h are added to the new picking system 1, starting from the operating point, a gain of around 200 journeys/h is achieved, and the total throughput increases to around 2200 journeys/h. In contrast to this, the gain achieved with two autonomous conveying vehicles in the conventional picking system is just around 20 journeys/h, whereby the total throughput is increased to around 2020 journeys/h. Therefore, the gain achieved per added autonomous conveying vehicle 5a ... 5l, 6a ... 6h in the operating point is around 10 times higher in the new picking system 1 than in the conventional picking system. The new picking system 1 is hence easier to scale.

Assuming, in the mentioned example, investment costs of EUR 20,000.- for an autonomous conveying vehicle 5a ... 5l, 6a ... 6h, the investment costs amount to EUR 360,000.- in the new picking system and EUR 640,000.- in the conventional picking system. As for the chronological development of the costs expended for the autonomous conveying vehicles 5a ... 5l, 6a ... 6h, it is assumed that the annual operating costs for the autonomous conveying vehicles 5a ... 5l, 6a ... 6h amount to 10% of the investment costs for the autonomous conveying vehicles 5a ... 5l, 6a ... 6h. Assuming that the autonomous conveying vehicles 5a ... 5l, 6a ... 6h are in operation for ten years, the total costs amount to EUR 720,000.- compared to EUR 1,280,000.-. Over time, the saving achieved by the newly proposed picking system 1 therefore doubles.

Overall, for the reasons mentioned, the new picking system 1 is considerably cheaper and considerably easier to scale while having the same performance.

Finally it should be noted that the scope of protection is determined by the patent claims. However, the description and the drawings are to be adduced for construing the claims. Individual features or feature combinations from the different exemplary embodiments shown and described may represent independent inventive solutions. The object underlying the independent inventive solutions may be gathered from the description.

In particular, it should be noted that the depicted devices may in reality also include more or fewer parts than depicted. The depicted devices and/or their parts may partially not be depicted to scale and/or are enlarged and/or are reduced in size.

LIST OF REFERENCE NUMBERS 1 picking system
2a, 2b goods
2c ordered goods
3 storage conveying device(s)
3A fixed-installation part of the storage conveying device(s)
3b non-fixed-installation part of the storage conveying device(s)
4 removal conveying device(s)
4a fixed-installation part of the removal conveying device(s)
4b non-fixed-installation part of the removal conveying device(s)
5a . . . 5e autonomous conveying vehicle for pallets
6a . . . 6h autonomous conveying vehicle for separated goods
7 storage rack
8 railborne storage-and-retrieval unit
9 storage transfer stations/depalletizer
10 storage roller conveyor
11 removal transfer station
12a, 12b palletizer
13 wall of the building
14a, 14b gates between travel surface segments
15a, 15b short-term intermediate storage area/buffer
16 goods-in point
17a, 17b goods-out point
18 lift for (a) separated good(s)
19 lift for autonomous conveying vehicles
20a, 20b lift for (a) group good(s)
21 underframe
22 drive
23 driven wheel
24 steerable wheel
25 vertical guidance
26 transport platform
27 electronic drive control
28 superordinate control
29a, 29b sensor
A1 goods acceptance zone
B1 . . . B7 storage zone
C storage area
D1, D2 goods transfer zone
E1 . . . E8 travel surface segment
F1 . . . F3 travel zone
G1 . . . G8 transfer zone
nF number of the journeys/transport processes per unit of time (hour)
$nF1_{max}$ maximum throughput new picking system
$nF2_{max}$ maximum throughput conventional picking system
$nF_{nom}$ rated throughput/rated capacity
nAGV number of the autonomous conveying vehicles
$nAGV1_{nom}$ number of conveying vehicles at the operating point new system
$nAGV2_{nom}$ number of conveying vehicles at the operating point conventional system
L1 performance curve of the conventional picking system
L2 performance curve of the new picking system

The invention claimed is:

1. A method for operating a picking system for picking goods, comprising the steps:

using an order processing computer to acquire a picking order and to determine ordered goods which are required for the picking order;

providing at least a goods acceptance zone, a storage zone having a plurality of storage areas for storing the goods, and a goods transfer zone;

defining a plurality of areas including first and second areas in the picking system;

assigning groups of autonomous conveying vehicles to the plurality of areas, said groups including a first group of autonomous conveying vehicles assigned to the first area and a second group of autonomous conveying vehicles assigned to the second area;

using at least one autonomous conveying vehicle from the first group to transport the goods from the goods acceptance zone to the storage zone or to transport the ordered goods from the storage zone to the goods transfer zone;

using at least one autonomous conveying vehicle from the second group to transport the ordered goods from the storage zone to the goods transfer zone or to transport the goods from the goods acceptance zone to the storage zone;

wherein the autonomous conveying vehicles assigned to the first group are deployable to an area other than the first area;

wherein the autonomous conveying vehicles assigned to the second group are deployable to an area other than the second area;

wherein the autonomous conveying vehicles assigned to the first group in operation travel distances and are deployed to travel in the area other than the first area no more than 10% of the distances traveled by the autonomous conveying vehicles of the plurality of groups; and wherein the autonomous conveying vehicles assigned to the second group in operation travel distances and are deployed to travel in the area other than the second area no more than 10% of the distances traveled by the autonomous conveying vehicles of the plurality of groups.

2. The method according to claim 1, wherein the autonomous conveying vehicles assigned to the first group are not deployed to travel in the area other than the first area during normal operation of the picking system and the autonomous conveying vehicles assigned to the second group are not deployed to travel in the area other than the second area during normal operation of the picking system.

3. The method according to claim 1, wherein there are different temperatures in the first and second areas.

4. The method according to claim 1, wherein
the first group of autonomous conveying vehicles, and
the second group of autonomous conveying vehicles have a second design,
wherein the second design is different from the first design.

5. The method according to claim 1, wherein the first group of autonomous conveying vehicles:
have a first maximum speed, and
the second group of autonomous conveying vehicles have a second maximum speed,
wherein the second maximum speed is different from the first maximum speed.

6. The method according to any claim 1,
wherein the first area is free for the access of persons during normal operation of the picking system; and
wherein the second area is blocked from the access of persons during normal operation of the picking system.

7. The method according to claim 1, wherein the storage zone comprises a first storage zone and a second storage zone and the goods are stored separated in the first storage zone and in groups in the second storage zone.

8. The method according to claim 7, wherein the goods or ordered goods are transported both separated and in groups by the autonomous conveying vehicles.

9. The method according to claim 7, wherein the goods or ordered goods are transported by the autonomous conveying vehicles only in groups in the first area and only separated in the second area.

10. The method according to claim 1, wherein a relation between a number of the autonomous conveying vehicles located in one of the first and second areas and a number of transfer points assigned to the first area or the second area is below 5, wherein the transfer points constitute interfaces between the autonomous conveying vehicles and the storage zone or between the autonomous conveying vehicles and a stationary conveying device.

11. The method according to claim 1, wherein the first and second areas are shut down or put into operation on the basis of a performance demand needed from the picking system.

12. The method according to claim 11, wherein:
the first area is put out of operation before the second area when a first transport path on a stationary conveying device running between a storage area of the plurality of storage areas and a transfer point assigned to the first area is longer than a second transport path on the stationary conveying device running between the storage area and a transfer point assigned to the second area or
the first area is put into operation after the second area when a first transport path on a stationary conveying device running between a storage area of the plurality of storage areas and a transfer point assigned to the first area is longer than a second transport path on the stationary conveying device running between the storage area and a transfer point assigned to the second area.

13. The method according to any claim 1, wherein:
a travel speed of the autonomous conveying vehicles in one of the first and second areas in which a failure has occurred is reduced compared to the normal operation or the autonomous conveying vehicles there are stopped and
the normal operation is perpetuated in one of the first and second areas in which no failure has occurred.

14. A picking system for picking goods, comprising:
an order processing computer to acquire a picking order and to determine ordered goods which are required for the picking order;
a goods acceptance zone and a goods transfer zone;
a storage zone with a plurality of storage areas for storing the goods;
a plurality of areas including a first area and a second area;
groups of autonomous conveying vehicles assigned to the plurality of areas, said groups including a first group of autonomous conveying vehicles assigned to the first area, wherein at least one autonomous conveying vehicle from the first area is configured for transporting the goods from the goods acceptance zone to the storage zone or to transport the ordered goods from the storage zone to the goods transfer zone, and a second group of autonomous conveying vehicles assigned to the second area, wherein at least one autonomous conveying vehicle from the second area is configured for transporting the ordered goods from the storage zone to the goods transfer zone or to transport the goods from the goods acceptance zone to the storage zone;
a control adapted for co-ordinating the autonomous conveying vehicles such that:
the autonomous conveying vehicles assigned to the first group in operation travel distances and are deployed to travel in an area other than the first area no more than 10% of the distances traveled by the autonomous conveying vehicles of the plurality of groups; and
the autonomous conveying vehicles assigned to the second group in operation travel distances and are deployed to travel in an area other than the second area no more than 10% of the distances traveled by the autonomous conveying vehicles of the plurality of groups.

15. The picking system according to claim 14, wherein the first and second areas are structurally separated from one another.

16. The picking system according to claim 15, wherein the first and second areas are arranged vertically on top of one another in different levels.

17. The picking system according to claim 16,
wherein the first area is arranged below the second area and the second area is arranged above the first area;
wherein there are different temperatures in the first and second areas;
wherein the temperature in the first area is lower than temperature in the second area.

18. The picking system according to claim 15, wherein the first and second areas are structurally separated from one another by walls.

19. The picking system according to claim 14, wherein a short-term intermediate storage area is arranged in the region of one of the first and second areas.

20. The picking system according to claim 19,
wherein the first and second areas are structurally separated from one another by storage racks;
wherein the storage racks comprise the short-term intermediate storage area;
wherein the storage racks are accessible from one of the first and second areas abutting the storage racks.

21. The picking system according to claim 19,
wherein the first and second areas are structurally separated from one another by storage racks;
wherein the storage racks comprise the short-term intermediate storage area; and
wherein the storage racks are accessible from both the first and second areas abutting the storage racks.

22. The picking system according to claim 14, wherein the picking system further comprises:
storage racks arranged in the storage zone and having storage areas;
a rail guided storage and retrieval unit; wherein the storage areas in the storage racks are accessible by the rail guided storage and retrieval unit;
a stationary storage transfer station provided upstream of the storage and retrieval unit, wherein the stationary storage transfer station is configured for transferring the goods from the autonomous conveying vehicles of the first group of autonomous conveying vehicles onto the stationary storage transfer station; and
a stationary removal transfer station provided downstream of the storage and retrieval unit, wherein the stationary removal transfer station is configured for transferring the ordered goods from the removal transfer station onto the autonomous conveying vehicles of the second group of autonomous conveying vehicles.

23. The picking system according to claim 14, wherein at least one workstation for picking the ordered goods into or onto dispatch goods carriers is arranged between the storage zone and the goods transfer zone.

24. The picking system according to claim 14, wherein at least one holding area for provisioning the goods on delivery containers and/or a separation device for provisioning separated goods is arranged between the goods acceptance zone and the storage zone.

25. A method for operating a picking system for picking goods, comprising the steps:
- using an order processing computer to acquire a picking order and to determine ordered goods which are required for the picking order;
- providing at least a goods acceptance zone, a storage zone having a plurality of storage areas for storing the goods, and a goods transfer zone;
- defining a plurality of areas including first and second areas in the picking system;
- assigning groups of autonomous conveying vehicles to the plurality of areas, said groups including a first group of autonomous conveying vehicles assigned to the first area and a second group of autonomous conveying vehicles assigned to the second area;
- using at least one autonomous conveying vehicle from the first group to transport the goods from the goods acceptance zone to the storage zone or to transport the ordered goods from the storage zone to the goods transfer zone;
- using at least one autonomous conveying vehicle from the second group to transport the ordered goods from the storage zone to the goods transfer zone or to transport the goods from the goods acceptance zone to the storage zone;
- wherein the autonomous conveying vehicles assigned to the first group are deployable to an area other than the first area;
- wherein the autonomous conveying vehicles assigned to the second group are deployable to an area other than the second area;
- wherein the autonomous conveying vehicles assigned to the first group in operation travel distances and are deployed to travel in the area other than the first area no more than 10% of the distances traveled by the autonomous conveying vehicles of the plurality of groups;
- wherein the autonomous conveying vehicles assigned to the second group in operation travel distances and are deployed to travel in the area other than the second area no more than 10% of the distances traveled by the autonomous conveying vehicles of the plurality of groups;
- wherein the first group of autonomous conveying vehicles have a first design , and the second group of autonomous conveying vehicles have a second design, and wherein the second design is different from the first design.

26. A picking system for picking goods, comprising:
- an order processing computer to acquire a picking order and to determine ordered goods which are required for the picking order;
- a goods acceptance zone and a goods transfer zone;
- a storage zone with a plurality of storage areas for storing the goods;
- a plurality of areas including a first area and a second area;
- groups of autonomous conveying vehicles assigned to the plurality of areas, said groups including a first group of autonomous conveying vehicles assigned to the first area, wherein at least one autonomous conveying vehicle from the first area is configured for transporting the goods from the goods acceptance zone to the storage zone or to transport the ordered goods from the storage zone to the goods transfer zone, and a second group of autonomous conveying vehicles assigned to the second area, wherein at least one autonomous conveying vehicle from the second area is configured for transporting the ordered goods from the storage zone to the goods transfer zone or to transport the goods from the goods acceptance zone to the storage zone;
- a control adapted for co-ordinating the autonomous conveying vehicles such that:
  - the autonomous conveying vehicles assigned to the first group in operation travel distances and are deployed to travel in an area other than the first area no more than 10% of the distances traveled by the autonomous conveying vehicles of the plurality of groups; and
  - the autonomous conveying vehicles assigned to the second group in operation travel distances and are deployed to travel in an area other than the second area no more than 10% of the distances traveled by the autonomous conveying vehicles of the plurality of groups;
- wherein the first group of autonomous conveying vehicles have a first design, and the second group of autonomous conveying vehicles have a second design, and wherein the second design is different from the first design.

* * * * *

UNITED STATES PATENT AND TRADEMARK OFFICE
CERTIFICATE OF CORRECTION

PATENT NO. : 11,912,505 B2
APPLICATION NO. : 16/962949
DATED : February 27, 2024
INVENTOR(S) : Michael Schedlbauer et al.

It is certified that error appears in the above-identified patent and that said Letters Patent is hereby corrected as shown below:

In the Claims

In Column 30, Line 48 (Line 2 of Claim 4), after "vehicles" add -- have a first design --

In Column 30, Line 60 (Line 1 of Claim 6) delete "any"

Signed and Sealed this
Twenty-sixth Day of March, 2024

Katherine Kelly Vidal
*Director of the United States Patent and Trademark Office*